(12) United States Patent
Chen et al.

(10) Patent No.: US 12,114,288 B2
(45) Date of Patent: Oct. 8, 2024

(54) COMMUNICATION METHOD AND APPARATUS

(71) Applicant: HUAWEI TECHNOLOGIES CO., LTD., Guangdong (CN)

(72) Inventors: Lei Chen, Beijing (CN); Xuelong Wang, Shenzhen (CN); Bingzhao Li, Beijing (CN); Hong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 359 days.

(21) Appl. No.: 17/576,395

(22) Filed: Jan. 14, 2022

(65) Prior Publication Data

US 2022/0141800 A1    May 5, 2022

Related U.S. Application Data

(63) Continuation of application No. PCT/CN2020/100003, filed on Jul. 2, 2020.

(30) Foreign Application Priority Data

Jul. 17, 2019   (CN) .......................... 201910647484.1

(51) Int. Cl.
*H04W 68/00* (2009.01)
*H04W 8/18* (2009.01)
*H04W 76/10* (2018.01)

(52) U.S. Cl.
CPC ......... *H04W 68/005* (2013.01); *H04W 8/183* (2013.01); *H04W 76/10* (2018.02)

(58) Field of Classification Search
CPC ... H04W 68/005; H04W 8/183; H04W 76/10; H04W 8/265; H04W 68/00; H04W 76/11;
(Continued)

(56) References Cited

U.S. PATENT DOCUMENTS 8,958,324 B2 * 2/2015 Chin .................... H04W 68/02
370/254
8,996,041 B2 * 3/2015 Chin .................... H04W 68/00
455/458

(Continued)

FOREIGN PATENT DOCUMENTS

CN         102256338 A      11/2011
CN         102546918 A       7/2012
(Continued)

OTHER PUBLICATIONS

Extended European Search Report issued in European Application No. 20841034.0 on Jul. 18, 2022, 11 pages.
(Continued)

*Primary Examiner* — Brian T O Connor
(74) *Attorney, Agent, or Firm* — Fish & Richardson P.C.

(57) ABSTRACT

This application provides a communication method and apparatus. The method includes: A network device pre-allocates a first identifier to a terminal device. When the terminal device has a requirement for adjusting the first identifier, the terminal device may send a first message carrying first information to the network device, to request the network device to adjust the first identifier. According to the method and the apparatus in this application, the identifier of the terminal device may be flexibly adjusted.

16 Claims, 6 Drawing Sheets

(58) Field of Classification Search
CPC ....... H04W 68/02; H04W 8/20; H04W 76/28; H04W 8/26; H04W 60/005; H04W 76/27; H04W 24/10; H04W 76/30; H04W 52/0209; H04L 61/5053; H04L 2101/654
See application file for complete search history.

(56) References Cited

U.S. PATENT DOCUMENTS

| | | | | |
|---|---|---|---|---|
| 9,326,268 | B2* | 4/2016 | Xia | H04W 68/005 |
| 9,408,183 | B2* | 8/2016 | Chirayil | H04W 68/02 |
| 10,492,169 | B2* | 11/2019 | Chen | H04W 68/12 |
| 11,368,937 | B2* | 6/2022 | Ryu | H04W 84/027 |
| 11,665,668 | B2* | 5/2023 | Ryu | H04W 84/027 455/458 |
| 11,706,739 | B2* | 7/2023 | Gurumoorthy | H04W 68/02 370/329 |
| 11,864,157 | B2* | 1/2024 | Guo | H04W 76/27 |
| 11,889,465 | B2* | 1/2024 | Ryu | H04W 76/20 |
| 11,889,471 | B2* | 1/2024 | Ryu | H04W 28/0289 |
| 11,917,580 | B2* | 2/2024 | Chun | H04W 60/005 |
| 2013/0303203 | A1 | 11/2013 | Wang et al. | |
| 2013/0316718 | A1 | 11/2013 | Hsu et al. | |
| 2014/0128082 | A1* | 5/2014 | Chirayil | H04W 68/02 455/438 |
| 2015/0065132 | A1* | 3/2015 | Ramkumar | H04W 48/16 455/435.2 |
| 2016/0095159 | A1* | 3/2016 | Su | H04W 52/0216 370/311 |
| 2017/0230932 | A1* | 8/2017 | Challa | H04W 68/02 |

FOREIGN PATENT DOCUMENTS

| | | |
|---|---|---|
| CN | 102573065 A | 7/2012 |
| CN | 103988555 A | 8/2014 |
| CN | 104126325 A | 10/2014 |
| CN | 105493574 A | 4/2016 |
| CN | 108419290 A | 8/2018 |
| CN | 108811084 A | 11/2018 |
| CN | 108924887 A | 11/2018 |
| EP | 2737762 A1 | 6/2014 |
| WO | 2013014000 A1 | 1/2013 |
| WO | 2014144363 A2 | 9/2014 |
| WO | 2017136078 A1 | 8/2017 |
| WO | 2018161244 A1 | 9/2018 |
| WO | 2018176219 A1 | 10/2018 |
| WO | 2019068223 A1 | 4/2019 |

OTHER PUBLICATIONS

Intel et al., "Solution for Paging Reception with PO collision avoidance", SA WG2 Meeting #S2-136, S2-1911942, Reno, USA, Nov. 18-22, 2019, 4 pages.
3GPP TS 38.304 V15.4.0 (Jun. 2019), "3rd Generation Partnership Project; Technical Specification Group Radio Access Network; NR; User Equipment (UE) procedures in Idle mode and RRC Inactive state(Release 15)," Jun. 2019, 29 pages.
Intel, "Revised SID: Study on system enablers for multi-SIM devices," SA WG2 Meeting #130, S2-1900688, Kochi, India, Jan. 21-25, 2019, 4 pages.
Intel, Sony, OPPO, InterDigital, "Solution for Paging Reception with PO collision avoidance," SA WG2 Meeting #S2-136, S2-1911942, Reno, USA, Nov. 18-22, 2019, 4 pages.
Nokia, Nokia Shanghai Bell, "KI#2, KI#3: New Solution: establishment of association on user plane for paging notification on user plane," SA WG2 Meeting #139-e, S2-2003765, Online, Jun. 1-12, 2020, 4 pages.
Office Action issued in Chinese Application No. 201910647484.1 on Jun. 3, 2021, 17 pages (with English translation).
PCT International Search Report and Written Opinion issued in International Application No. PCT/CN2020/100003 on Sep. 2, 2020, 20 pages (with English translation).
Qualcomm Incorporated, Oppo, China Unicom, Vivo, "Avoidance of paging collisions to minimize outage of services," SA WG2 Meeting #122, S2-174243, San Jose Del Cabo, Mexico, Jun. 26-30, 2017, 8 pages.
Samsung, NEC, Airtel, InterDigital, "KI #1, New Sol: Informing network two USIMs belongs to same device," SA WG2 Meeting #139E (e-meeting), S2-2004270, Elbonia, Jun. 1-12, 2020, 3 pages.
Sony, Nokia, Convida Wireless, NEC, "KI #2: New Sol: Paging Reception with PO collision avoidance using alt. UE_ID," SA WG2 Meeting #139E (E-meeting), S2-2004591, Elbonia, Jun. 1-12, 2020, 5 pages.
Vivo, "vivo views on NR Rel-17," 3GPP TSG RAN Meeting #84, RP-190833, Newport Beach, USA, Jun. 3-6, 2019, 22 pages.
Office Action in Chinese Appln. No. 202080051463.4, dated Dec. 16, 2022, 7 pages.

* cited by examiner

COMMUNICATION METHOD AND APPARATUS

CROSS-REFERENCE TO RELATED APPLICATION

This application is a continuation of International Application No. PCT/CN2020/100003, filed on Jul. 2, 2020, which claims priority to Chinese Patent Application No. 201910647484.1, filed on Jul. 17, 2019. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

In a wireless communication system, a network device may allocate an identifier to a terminal device, and the identifier may uniquely identify the terminal device in a network. In the current technology, after the network device allocates the identifier to the terminal device, the identifier is usually unchangeable. However, in some scenarios, the identifier of the terminal device needs to be adjusted, and how to adjust the identifier of the terminal device is a current research hotspot.

SUMMARY

According to a first aspect, a communication method is provided. The method includes: A terminal device determines first information, where the first information is used to request to adjust a first initial identifier of the terminal device. The terminal device sends a first message carrying the first information to a network device.

In this embodiment of this application, the network device may pre-allocate a first identifier to the terminal device. When the terminal device has a requirement for adjusting the first identifier, the terminal device may send the first message carrying the first information to the network device, to request the network device to adjust the first identifier. It can be learned from the foregoing descriptions that, in this embodiment of this application, an identifier allocated by the network device to the terminal device may be flexibly adjusted.

In a possible design, the first information is used to request to adjust the first initial identifier of the terminal device to a first update identifier.

In a possible design, the first information includes at least one of the following: the first update identifier; first indication information, where the first indication information is used to indicate the first update identifier; a first offset between the first initial identifier and the first update identifier; and second indication information, where the second indication information is used to indicate the first offset between the first initial identifier and the first update identifier.

In a possible design, the method further includes: The terminal device receives third indication information from the network device, where the third indication information is used to indicate to adjust the first initial identifier of the terminal device to the first update identifier, or the third indication information is used to indicate to adjust the first initial identifier of the terminal device to a first recommendation identifier.

In a possible design, before the terminal device determines the first information, the method further includes: The terminal device determines that a time domain position of a first paging occasion needs to be adjusted, where the first paging occasion corresponds to the first initial identifier.

In a possible design, that the terminal device determines that a time domain position of a first paging occasion needs to be adjusted includes:

The terminal device determines that the first paging occasion partially overlaps or completely overlaps with a second paging occasion, and a mode of the terminal device is single reception single transmission; or the terminal device determines that the first paging occasion partially overlaps or does not overlap with a second paging occasion, and a mode of the terminal device is dual reception dual transmission, where the second paging occasion corresponds to a second initial identifier, and the first initial identifier is different from the second initial identifier.

In a possible design, the first paging occasion corresponds to a first communication network, and the second paging occasion corresponds to a second communication network.

According to a second aspect, a communication method is provided. The method includes: A network device receives a first message from a terminal device, where the first message carries first information, and the first information is used to request to adjust a first initial identifier of the terminal device.

In a possible design, the first information is used to request to adjust the first initial identifier of the terminal device to a first update identifier.

In a possible design, the first information includes at least one of the following: the first update identifier; first indication information, where the first indication information is used to indicate the first update identifier; a first offset between the first initial identifier and the first update identifier; and second indication information, where the second indication information is used to indicate the first offset between the first initial identifier and the first update identifier.

In a possible design, the method further includes: The network device sends third indication information to the terminal device, where the third indication information is used to indicate to adjust the first initial identifier of the terminal device to the first update identifier, or the third indication information is used to indicate to adjust the first initial identifier of the terminal device to a first recommendation identifier.

In a possible design, the network device is a core network device, and the method further includes: The core network device sends fourth indication information to an access network device, where the fourth indication information is used to indicate the first update identifier, or the fourth indication information is used to indicate the first offset between the first initial identifier and the first update identifier.

According to a third aspect, a communication method is provided. The method includes: A terminal device determines first information, where the first information is used to request to associate a first identifier and a second identifier of the terminal device. The terminal device sends a first message carrying the first information to a network device.

In this embodiment of this application, the first identifier may correspond to a first paging occasion PO, and the second identifier may correspond to a second PO. In this embodiment of this application, the first identifier is associated with the second identifier. Paging corresponding to two identifiers is transferred to one identifier. For example, after the first identifier is associated with the second identifier, the first identifier is a primary identifier, and the second identifier is a secondary identifier. In this case, a paging message corresponding to the second identifier is transferred to the first identifier for sending. Correspondingly, the terminal device performs paging monitoring only at a first PO position corresponding to the first identifier, and no longer performs monitoring at a second PO position corresponding to the second identifier, thereby reducing a waste of energy on a terminal device side.

In a possible design, the method further includes: The terminal device receives a second message from the network device, where the second message carries first indication information, and the first indication information is used to indicate that the first identifier and the second identifier are associated.

In a possible design, the method further includes: The terminal device determines a first paging occasion based on the first identifier. The terminal device receives a paging message on the first paging occasion, where the paging message includes the first identifier and/or the second identifier.

In a possible design, the first identifier includes a first temporary mobile subscriber identity S-TMSI or a first inactive radio network temporary identifier I-RNTI; and/or the second identifier includes a second S-TMSI or a second I-RNTI.

In a possible design, the first message is a registration message corresponding to the second identifier, and the second message is a registration response message corresponding to the second identifier; or the first message is a tracking area update TAU message, and the second message is a TAU response message.

According to a fourth aspect, a communication method is provided. The method includes: A network device receives a first message from a terminal device, where the first message carries first information, and the first information is used to request to associate a first identifier and a second identifier of the terminal device.

In a possible design, the method further includes: The network device sends a second message carrying first indication information to the terminal device, where the first indication information is used to indicate that the first identifier and the second identifier are associated.

In a possible design, the method further includes: The network device determines a first paging occasion based on the first identifier. The network device sends a paging message to the terminal device on the first paging occasion, where the paging message includes the first identifier and/or the second identifier.

In a possible design, the first identifier includes a first temporary mobile subscriber identity S-TMSI or a first inactive radio network temporary identifier I-RNTI; and/or the second identifier includes a second S-TMSI or a second I-RNTI.

In a possible design, the first message is a registration message corresponding to the second identifier, and the second message is a registration response message corresponding to the second identifier; or the first message is a tracking area update TAU message, and the second message is a TAU response message.

In a possible design, the network device is a core network device, and the method further includes: The core network device sends a paging message to an access network device, where the paging message includes the first identifier and the second identifier.

According to a fifth aspect, a communication apparatus is provided. The apparatus includes: a processing module, configured to determine first information, where the first information is used to request to adjust a first initial identifier of a terminal device; and a transceiver module, configured to send first information to a network device.

For specific processes of the processing module and the transceiver module, refer to the descriptions in the first aspect. Details are not described herein again.

According to a sixth aspect, a communication apparatus is provided. The apparatus includes: a transceiver module, configured to receive a first message from a terminal device, where the first message carries first information, and the first information is used to request to adjust a first initial identifier of the terminal device. Optionally, the communication apparatus may further include: a processing module, configured to process the first message.

For specific processes of the transceiver module and the processing module, refer to the descriptions in the second aspect. Details are not described herein again.

According to a seventh aspect, a communication apparatus is provided. The apparatus includes: a processing module, configured to determine first information, where the first information is used to request to associate a first identifier and a second identifier of a terminal device; and a transceiver module, configured to send a first message carrying the first information to a network device.

For specific processes of the processing module and the transceiver module, refer to the descriptions in the third aspect. Details are not described herein again.

According to an eighth aspect, a communication apparatus is provided. The apparatus includes a transceiver module, configured to receive a first message from a terminal device, where the first message carries first information, and the first information is used to request to associate a first identifier and a second identifier of the terminal device. Optionally, the apparatus may further include a processing module, configured to process the first message.

For specific processes of the transceiver module and the processing module, refer to the descriptions in the fourth aspect. Details are not described herein again.

According to a ninth aspect, a communication apparatus is provided. The apparatus includes: a processor, configured to determine first information, where the first information is used to request to adjust a first initial identifier of a terminal device; and a communication interface, configured to send a first message carrying the first information to a network device.

For specific descriptions of the processor and the communication interface, refer to the descriptions in the first aspect. Details are not described herein again.

According to a tenth aspect, a communication apparatus is provided. The apparatus includes a communication interface, configured to receive a first message from a terminal device, where the first message carries first information, and the first information is used to request to adjust a first initial identifier of the terminal device. Optionally, the apparatus may further include a processor, and the processor is configured to process the first message.

For specific descriptions of the processor and the communication interface, refer to the descriptions in the second aspect. Details are not described herein again.

According to an eleventh aspect, a communication apparatus is provided. The apparatus includes: a processor, configured to determine first information, where the first information is used to request to associate a first identifier and a second identifier of a terminal device; and a communication interface, configured to send the first information to a network device.

For specific descriptions of the processor and the communication interface, refer to the descriptions in the third aspect. Details are not described herein again.

According to a twelfth aspect, a communication apparatus is provided. The apparatus includes a communication interface, configured to receive a first message from a terminal device, where the first message carries first information, and the first information is used to request to associate a first identifier and a second identifier of the terminal device. Optionally, the communication apparatus may further include a processor, configured to process the first message.

For specific descriptions of the communication interface and the processor, refer to the descriptions in the fourth aspect. Details are not described herein again.

According to a thirteenth aspect, a computer-readable storage medium is further provided. The computer-readable storage medium includes instructions. When the instructions are run on a computer, the computer is enabled to perform the method according to a design in any one of the first aspect to the fourth aspect.

According to a fourteenth aspect, an embodiment of this application further provides a chip system. The chip system includes a processor, may further include a memory, and is configured to implement the method according to a possible design in any one of the first aspect to the fourth aspect. The chip system may include a chip, or may include a chip and another discrete component.

According to a fifteenth aspect, an embodiment of this application further provides a computer program product, including instructions. When the instructions are run on a computer, the computer is enabled to perform the method according to a possible design in any one of the first aspect to the fourth aspect.

According to a sixteenth aspect, an embodiment of this application provides a system. The system includes the network device and the terminal device according to any one of the foregoing aspects.

DESCRIPTION OF EMBODIMENTS

The following describes technical solutions in embodiments of this application with reference to the accompanying drawings in the embodiments of this application.

Figure 1:
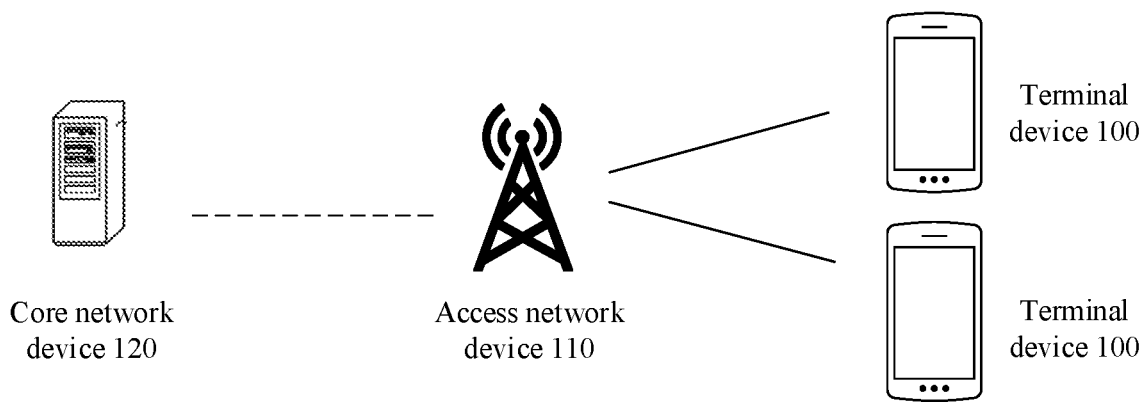
FIG. 1 is a schematic diagram of a network architecture according to an embodiment of this application.

FIG. 1 is a schematic diagram of a possible network architecture to which an embodiment of this application is applicable. The network architecture includes a terminal device 100 and an access network device 110.

The terminal device 100 may communicate with the access network device 110 through a Uu interface. Communication performed through the Uu interface may include uplink transmission and downlink transmission. The uplink transmission may mean that the terminal device 100 sends an uplink signal or uplink information to the access network device 110, and the downlink transmission may mean that the access network device 110 sends a downlink signal or downlink information to the terminal device 100. The Uu interface may be understood as a universal UE to network interface (universal UE to network interface).

Optionally, in the architecture shown in FIG. 1, a core network device 120 may be further included. The terminal device 100 may communicate with the core network device 120 through a wired interface or a wireless interface. For example, the terminal device 100 may communicate with the core network device 120 through the access network device 110. Alternatively, the terminal device 100 may directly communicate with the core network device 120, and so on.

It may be understood that in the architecture shown in FIG. 1, one core network device, one access network device, and two terminal devices are schematically indicated. This is not a limitation on this application. For example, in this embodiment of this application, another quantity of access network devices rather than one access network device may be further included, another quantity of core network devices rather than one core network device may be further included, and another quantity of terminal devices rather than two terminal devices may be further included.

The following explains and describes some communication nouns or terms used in the embodiments of this application. The communication nouns or terms are also used as a part of invention content of this application.

1. Terminal Device

The terminal device may be referred to as a terminal for short, and is a device having a wireless transceiver function. The terminal device may be deployed on land, where the deployment includes indoor or outdoor, or handheld or vehicle-mounted deployment, may be deployed on water (for example, on a ship), or may be deployed in the air (for example, on a plane, a balloon, or a satellite). The terminal device may be a mobile phone (mobile phone), a tablet computer (pad), a computer having a wireless transceiver function, a virtual reality (virtual reality, VR) terminal device, an augmented reality (augmented reality, AR) terminal device, a wireless terminal device in industrial control (industrial control), a wireless terminal device in self driving (self driving), a wireless terminal device in telemedicine (remote medical), a wireless terminal device in a smart grid (smart grid), a wireless terminal device in transportation safety (transportation safety), a wireless terminal device in a smart city (smart city), or a wireless terminal device in a smart home (smart home), and may further include user equipment (user equipment, UE) and the like. Alternatively, the terminal device may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a future 5th generation (the 5th generation, 5G) network, a terminal device in a future evolved public land mobile network (public land mobile network, PLMN), or the like. The terminal device sometimes may also be referred to as a terminal device, user equipment (user equipment, UE), an access terminal device, a vehicle-mounted terminal device, an industrial control terminal device, a UE unit, a UE station, a mobile station, a remote station, a remote terminal device, a mobile device, a UE terminal device, a terminal device, a wireless communication device, a UE agent, a UE apparatus, or the like. The terminal device may be fixed or movable. This is not limited in the embodiments of this application.

In the embodiments of this application, an apparatus configured to implement a terminal function may be a terminal, or may be an apparatus, for example, a chip system, that can support the terminal in implementing the function. The apparatus may be installed in the terminal. In the embodiments of this application, the chip system may include a chip, or may include a chip and another discrete component.

2. Network Device

The network device may be an access network device. The access network device may also be referred to as a radio access network (radio access network, RAN) device, and is a device that provides a wireless communication function for a terminal device. For example, the network device includes but is not limited to: a next-generation base station (generation node B, gNB) in 5G, an evolved NodeB (evolved node B, eNB), a radio network controller (radio network controller, RNC), a NodeB (node B, NB), a base station controller (base station controller, BSC), a base transceiver station (base transceiver station, BTS), a home base station (for example, a home evolved node B or a home node B, HNB), a baseband unit (baseband unit, BBU), a transmission reception point (transmitting and receiving point, TRP), a transmitting point (transmitting point, TP), and a mobile switching center. Alternatively, the network device may be a radio controller, a centralized unit (centralized unit, CU), and/or a distributed unit (distributed unit, DU) in a cloud radio access network (cloud radio access network, CRAN) scenario, or the network device may be a relay station, an access point, a vehicle-mounted device, a terminal device, a wearable device, a network device in a future 5G network, a network device in a future evolved PLMN network, or the like. The terminal device may communicate with a plurality of network devices using different technologies. For example, the terminal device may communicate with a network device supporting long term evolution (long term evolution, LTE), may communicate with a network device supporting 5G, or may implement dual connectivity with a network device supporting LTE and a network device supporting 5G. This is not limited in the embodiments of this application.

In the embodiments of this application, an apparatus configured to implement a network device function may be a network device, or may be an apparatus, for example, a chip system, that can support the network device in implementing the function. The apparatus may be installed in the network device.

3. Dual SIM Dual Standby (Dual SIM Dual Standby, DSDS)

Dual SIM dual standby refers to a technology in which one terminal device may have two subscriber identification module (subscriber identification module, SIM) cards at the same time, and both SIM cards can work normally. The foregoing two SIM cards may belong to a same operator or different operators. For example, a SIM card 1 and a SIM card 2 may both belong to the operator China Mobile, or the SIM card 1 may belong to the operator China Mobile, and the SIM card 2 may belong to the operator China Unicom. The foregoing two SIM cards may also belong to a same communication standard or different communication standards. For example, the SIM card 1 and the SIM card 2 may both belong to new radio access technology (new RAT, radio access technology, NR), or the SIM card 1 may belong to long term evolution (long term evolution, LTE), and the SIM card 2 may belong to NR.

4. Paging Occasion (Paging Occasion, PO)

To save battery power, a terminal device may enter an idle (idle) state and an inactive (inactive) state, and sleep. The terminal device may wake up the terminal device itself in a specified time unit according to a specific periodicity, and monitor whether a network device pages the terminal device itself. If the terminal device monitors that the network device pages the terminal device itself, the terminal device switches to an active state. Otherwise, the terminal device continues to maintain a current state. The time unit in which the terminal device monitors paging may be referred to as a paging occasion (paging occasion, PO).

5. Identifier of a Terminal Device

The identifier of the terminal device may be an identifier allocated by a network device to the terminal device. For a single SIM single standby terminal device, for example, if the single SIM single standby terminal device is configured to use a SIM card 1, an identifier of the terminal device may be an identifier corresponding to the SIM card 1. For a dual SIM dual standby terminal device, for example, if the dual SIM dual standby terminal device is configured to use a SIM card 1 and a SIM card 2, an identifier of the terminal device may be an identifier corresponding to the SIM card 1 or an identifier corresponding to the SIM card 2. A SIM card in the embodiments of this application may be a physical SIM card or a virtual SIM card. This is not limited.

It should be noted that in the embodiments of this application, the identifier of the terminal device may include an initial identifier of the terminal device and an update identifier of the terminal device. The initial identifier may be an unadjusted identifier initially allocated by the network device to the terminal device. The update identifier may be an adjusted identifier and the like. Both the initial identifier of the terminal device and the update identifier of the terminal device may be referred to as a UE-ID of the terminal device and the like. It may be understood that the foregoing "initial" and "update" are used only for distinction and description, and have no other meaning. Specifically, in the following descriptions, a first update identifier may also be referred to as a third identifier, and a second update identifier may also be referred to as a fourth identifier. The identifier of the terminal device may be a temporary mobile subscriber identity (temporary mobile subscriber identity, TMSI), a system architecture evolution temporary mobile subscriber identity (system architecture evolution, SAE, temporary mobile subscriber identity, S-TMSI), a 5G-S-TMSI, an international mobile subscriber identity (international mobile subscriber identity, IMSI), an inactive radio network temporary identifier (inactive radio network temporary identifier, I-RNTI), or another identifier. This is not limited. Optionally, the inactive radio network temporary identifier may also be referred to as a non-active radio network temporary identifier and the like.

6. "And/or"

The term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects.

A method in the embodiments of this application may be applied to a 5G NR communication system, an LTE communication system, or another communication system. A communication system falls within the protection scope of this application as long as an entity, an identifier used to request to adjust the entity, and another entity for receiving the request exist in the communication system. Terms such as "first" and "second" are used only for distinction and description, but should not be understood as indicating or implying relative importance, or should not be understood as indicating or implying an order or the like.

Figure 2:
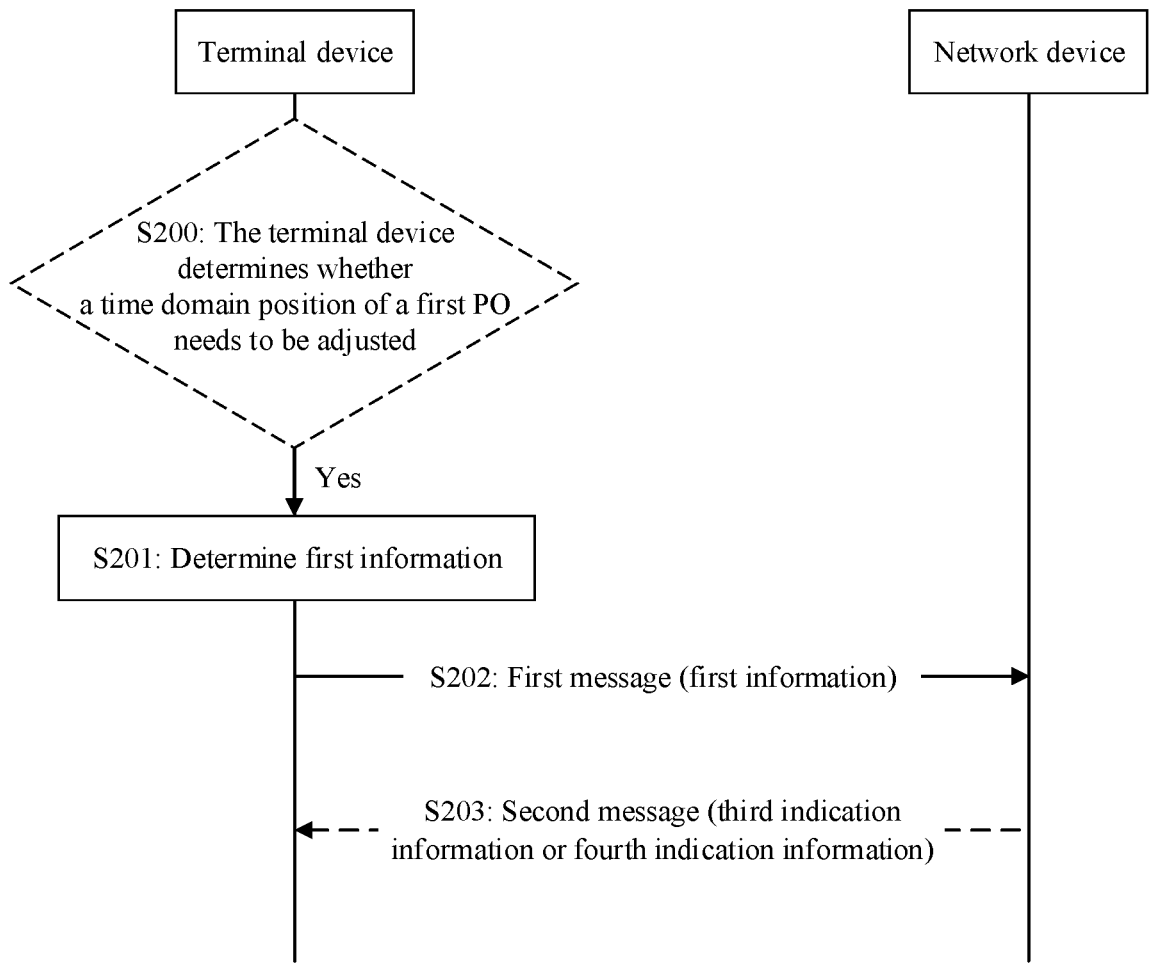
FIG. 2 is a flowchart of a communication method according to an embodiment of this application.

As shown in FIG. 2, a procedure of a communication method is provided. In the procedure, a terminal device may be the terminal device 100 in the architecture shown in FIG. 1, and a network device may be the access network device 110 or the core network device 120 in the architecture shown in FIG. 1. The procedure includes the following steps:

S201: The terminal device determines first information, where the first information is used to request to adjust a first initial identifier of the terminal device, or the first information is used to request to adjust the first initial identifier of the terminal device to a first update identifier.

For example, the first information may directly carry the first update identifier, or the first information may carry first indication information, and the first indication information is used to indicate the first update identifier. Alternatively, the first information may directly carry a first offset, where the first offset is an offset between the first initial identifier and the first update identifier, or the first information may carry second indication information, where the second indication information is used to indicate the first offset. Alternatively, the first information may carry one or more of the first update identifier, the first indication information, the first offset, and the second indication information. This is not limited in this embodiment of this application.

It should be noted that, the "identifier" of the "identifier", the "initial identifier", the "update identifier", and the like in this embodiment of this application may refer to an identifier allocated by the network device to the terminal device. The "identifier" may alternatively refer to an identifier determined or calculated by the terminal device based on the identifier allocated by the network device to the terminal device. For example, the terminal device may use, as the "identifier", a value of the identifier allocated by the network device to the terminal device mod 1024. Specific content and a definition manner of the identifier are not specifically limited in this application.

In the following embodiments of this application, a UE-ID is mostly used as an example for description. Optionally, a UE-ID corresponding to a SIM card may refer to a UE-ID allocated by the network device to the terminal device, for example, a 5G-S-TMSI, or the UE-ID corresponding to the SIM card may refer to a value of a UE-ID allocated by the network device to the SIM card mod 1024, for example, a value of 5G-S-TMSI mod 1024. This is not specifically limited.

S202: The terminal device sends a first message carrying the first information to the network device.

In this embodiment of this application, in the foregoing S202, the terminal device may send the first message to a network device corresponding to a first identifier. Correspondingly, in the following S203, the network device corresponding to the first identifier sends a second message to the terminal device. Alternatively, in the foregoing S202, the terminal device may send the first message to a network device corresponding to a second identifier. Correspondingly, in the following S203, the network device corresponding to the second identifier sends a second message to the terminal device. The network device corresponding to the first identifier and the network device corresponding to the second identifier are a same network device or different network devices. This is not limited.

In this embodiment of this application, after receiving the first message, the network device may obtain the first information in the first message. The network device determines whether to approve a request of the terminal device. If the network device approves the request of the terminal device, the network device sends third indication information to the terminal device, where the third indication information is used to indicate the terminal device to adjust the first initial identifier to the first update identifier. If the network device does not approve the request of the terminal device, the network device may allocate a first recommendation identifier to the terminal device, and send fourth indication information to the terminal device, where the fourth indication information is used to indicate the terminal device to adjust the first initial identifier to the first recommendation identifier.

It may be understood that, in this embodiment of this application, the third indication information or the fourth indication information may be carried in a response message of the first message. To be specific, after receiving the first message, the network device may send the second message to the terminal device, where the second message may carry the third indication information or the fourth indication information. The second message may be the response message of the first message. Therefore, optionally, in the procedure shown in FIG. 2, the method may further include S203: The network device sends the second message carrying the third indication information or the fourth indication information to the terminal device.

For example, in this embodiment of this application, a terminal device side may correspond to two identifiers, namely, the first identifier and the second identifier. For ease of description, an unadjusted first identifier may be referred to as the first initial identifier, and an adjusted first identifier may be referred to as the first update identifier. An unadjusted second identifier may be referred to as a second initial identifier, and an adjusted second identifier may be referred to as a second update identifier. It may be understood that, in the foregoing embodiment, an example in which the terminal device corresponds to two identifiers is used for description, and this is not intended to limit this embodiment of this application. For example, in this embodiment of this application, the terminal device may alternatively correspond to another quantity of identifiers rather than two identifiers, for example, one identifier or three identifiers.

In this embodiment of this application, the terminal device may determine a first PO based on the first initial identifier, or it may be described as that the first initial identifier corresponds to the first PO. A second PO may be determined based on the second initial identifier, or it may be described as that the second initial identifier corresponds to the second PO. How to determine a PO based on an initial identifier is specifically described in the following embodiments.

In this embodiment of this application, the terminal device may first determine whether a time domain position of the first PO needs to be adjusted, and if the time domain position of the first PO needs to be adjusted, perform S201 in the procedure shown in FIG. 2. Therefore, in the procedure shown in FIG. 2, the method may further include S200: The terminal device determines whether the time domain position of the first PO needs to be adjusted. If yes, S201 is performed. Otherwise, the procedure ends.

It should be noted that the method shown in the procedure in FIG. 2 may be applied to a dual SIM dual standby scenario, or may be applied to another scenario. This is not limited. For example, the method shown in the procedure in FIG. 2 may be further applied to a scenario in which a network side allocates only one UE-ID to a terminal device, that is, a single SIM single standby scenario.

For example, when the method shown in the procedure in FIG. 2 is applied to the dual SIM dual standby scenario, the terminal device may be in a dual SIM dual standby mode, and the terminal device may be configured to use a first SIM card and a second SIM card. The SIM card may be a virtual SIM card or a physical SIM card. The network device may allocate, to the terminal device, two UE-IDs, namely, a UE-ID corresponding to the first SIM card and a UE-ID corresponding to the second SIM card. The UE-ID corresponding to the first SIM card may be specifically a UE-ID allocated by the network device to the first SIM card. The UE-ID corresponding to the second SIM card may be specifically a UE-ID allocated by the network device to the second SIM card. In this embodiment of this application, the UE-ID corresponding to the first SIM card or the UE-ID corresponding to the second SIM card may be adjusted. When the method in the procedure shown in FIG. 2 is used to adjust the UE-ID corresponding to the first SIM card, the first initial identifier of the terminal device in the procedure shown in FIG. 2 may be an unadjusted UE-ID corresponding to the first SIM card. The first update identifier of the terminal device may be an adjusted UE-ID corresponding to the first SIM card. When the method in the procedure shown in FIG. 2 is used to adjust the UE-ID corresponding to the second SIM card, the first initial identifier of the terminal device in the procedure shown in FIG. 2 may be an unadjusted UE-ID corresponding to the second SIM card. The first update identifier of the terminal device may be an adjusted UE-ID corresponding to the second SIM card.

For example, when the method shown in the procedure in FIG. 2 is applied to the single SIM single standby scenario, the terminal device may be in a single SIM single standby mode, and the terminal device may be configured to use a first SIM card. The first SIM card may be a physical SIM card or a virtual SIM card. The network device may allocate one UE-ID to the terminal device, where the UE-ID is a UE-ID corresponding to the first SIM card. When the method in the procedure shown in FIG. 2 is used to adjust the UE-ID corresponding to the first SIM card, an unadjusted UE-ID corresponding to the first SIM card may correspond to the first initial identifier of the terminal device in the procedure shown in FIG. 2, and an adjusted UE-ID corresponding to the first SIM card may correspond to the first update identifier of the terminal device in the procedure shown in FIG. 2.

Example 1

In this embodiment of this application, when a mode of the terminal device is single reception single transmission, and the time domain position of the first PO partially overlaps or completely overlaps with a time domain position of the second PO, the terminal device may determine that the time domain position of the first PO needs to be adjusted. Through adjustment according to the procedure shown in FIG. 2, the time domain position of the first PO and the time domain position of the second PO may not overlap at all.

For example, in this embodiment of this application, the first PO may correspond to a first communication network, the second PO may correspond to a second communication network, and communication standards of the first communication network and the second communication network are the same or different. The communication network may use a standard such as 3G, LTE, NR, even future 6G, or the like. That the first communication network is the same as the second communication network may mean that the first communication network and the second communication network use a same communication standard and have a same operator. That the first communication network is different from the second communication network may mean that the first communication network and the second communication network use different communication standards or have different operators.

For example, the foregoing procedure is described in detail by using an example in which the terminal device is in the dual SIM dual standby mode and the terminal device side is configured to use the first SIM card and the second SIM card.

Usually, for dual SIM dual standby terminal devices, the terminal devices may be classified into the following three types based on different transceiver capabilities of the terminal devices: a dual reception dual transmission (dual Rx/Tx, transport/receive) terminal, a dual reception single transmission (dual Rx/single Tx) terminal, and a single reception single transmission (single Rx/single Tx) terminal.

The dual reception dual transmission terminal means that the terminal device can simultaneously receive and send data of the foregoing two SIM cards. The dual reception single transmission terminal means that the terminal device can simultaneously receive data in the foregoing two SIM cards, but the terminal device can send only data in one SIM card in a specific time unit. The single reception single transmission terminal means that the terminal device can receive/send only data of one of the foregoing two SIM cards in a specific time unit.

In addition, to save battery power, the terminal device may enter an idle (idle) state and an inactive (inactive) state, and sleep. The terminal device may wake up the terminal device itself at a specified time domain position according to a specific periodicity, and monitor whether the network device pages the terminal device itself. If paging corresponding to the network device is detected, the terminal device switches to an active state. Otherwise, the terminal device continues to maintain a current state. The time domain position at which the terminal device wakes up the terminal device itself may be referred to as a paging occasion (paging occasion, PO).

It can be learned from the foregoing analysis that, for the terminal in the single reception single transmission mode, the terminal device can receive only data corresponding to one SIM card at a specific time domain position. If PO positions of the two SIM cards overlap, the terminal device can monitor, in a time unit corresponding to the PO position, only whether a network device corresponding to one SIM card pages the terminal device. As a result, monitoring of information of the other SIM card may be missed. Therefore, in this embodiment of this application, for the single reception single transmission terminal, when a first PO position completely overlaps or partially overlaps with a second PO position, the time domain position of the first PO needs to be adjusted.

Figure 3:
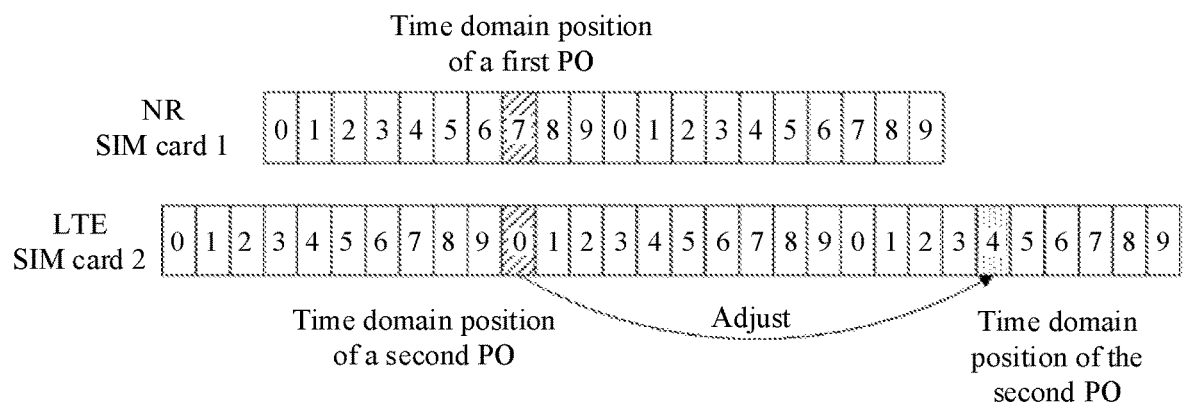
FIG. 3 is a schematic diagram of PO position adjustment according to an embodiment of this application.

For example, as shown in FIG. 3, one paging frame (paging frame, PF) includes 10 subframes, and indexes of the subframes are 0 to 9 successively. The first SIM card uses the NR communication standard, the second SIM card uses the LTE communication standard, and there is a timing offset (timing offset) of three subframes between the first SIM card and the second SIM card. The time domain position of the first PO corresponding to the first SIM card is a subframe whose index is 7 in a first PF, and the time domain position of the second PO corresponding to the second SIM card is a subframe whose index is 0 in a second PF. It can be learned from FIG. 3 that the time domain position of the first PO completely overlaps with the time domain position of the second PO. In this case, the time domain position of the second PO corresponding to the second SIM card may be adjusted. For example, the time domain position of the second PO corresponding to the second SIM card may be adjusted to a subframe whose index is 5 in a third PF. In the foregoing manner, for the single reception single transmission terminal, a paging message of a SIM card 1 may be monitored in the subframe whose index is 7 in the first PF, and a paging message of a SIM card 2 may be monitored in the subframe whose index is 5 in the third PF, to avoid missing monitoring information about the SIM card.

It may be understood that, in the example shown in FIG. 3, descriptions are provided by using an example in which the time domain position of the first PO and the time domain position of the second PO completely overlap. When the time domain position of the first PO partially overlaps with the time domain position of the second PO, an adjustment process is similar to the foregoing process, and is not described herein by using an example.

Example 2

In this embodiment of this application, when a mode of the terminal device is dual reception dual transmission, and the time domain position of the first PO and the time domain position of the second PO partially overlap or do not overlap at all, the terminal device may determine that the time domain position of the first PO needs to be adjusted. According to the method in the procedure shown in FIG. 2, the time domain position of the first PO and the time domain position of the second PO may completely overlap.

In this embodiment of this application, the foregoing procedure is described by using an example in which the terminal device is configured to use the first SIM card and the second SIM card, and the terminal device is in a dual reception dual transmission mode.

For example, for the dual reception dual transmission terminal, when the two SIM cards have a same operator and use a same standard, the foregoing two SIM cards may most likely camp on a same cell. If PO positions of the network device do not overlap, the network device needs to monitor paging messages of the network device at a plurality of PO positions, resulting in a waste of battery power. Therefore, in this embodiment of this application, for the terminal device in the dual reception dual transmission mode, when two PO positions partially overlap or do not overlap at all, the two PO positions need to be adjusted to completely overlap, to reduce monitoring power consumption of the terminal device. For example, in this embodiment of this application, a network device corresponding to the first SIM card is a network device 1, and a PO position corresponding to the first SIM card is a position 1, a network device corresponding to the second SIM card is a network device 2, and a PO position corresponding to the second SIM card is a position 2. In an example, the terminal device may wake up the terminal device itself at the PO position 1 according to a specific periodicity, and monitors whether the network device 1 pages the terminal device itself. The terminal device wakes up the terminal device itself at the PO position 2 according to a specific periodicity, and monitors whether the network device 2 pages the terminal device itself. However, when the two SIM cards camp on the same cell, network devices corresponding to the two SIM cards are the same, that is, the network device 1 and the network device 2 are a same network device. It is unnecessary for the terminal device to wake up the terminal device itself in the foregoing manner, where waking up the terminal device in the foregoing manner may lead to a waste of battery power. An improvement in this embodiment of this application is that when the two SIM cards of the terminal device camp on the same cell, the PO position corresponding to the SIM card 1 and the PO position corresponding to the SIM card 2 may be adjusted to completely overlap, to save the battery power.

Figure 4:
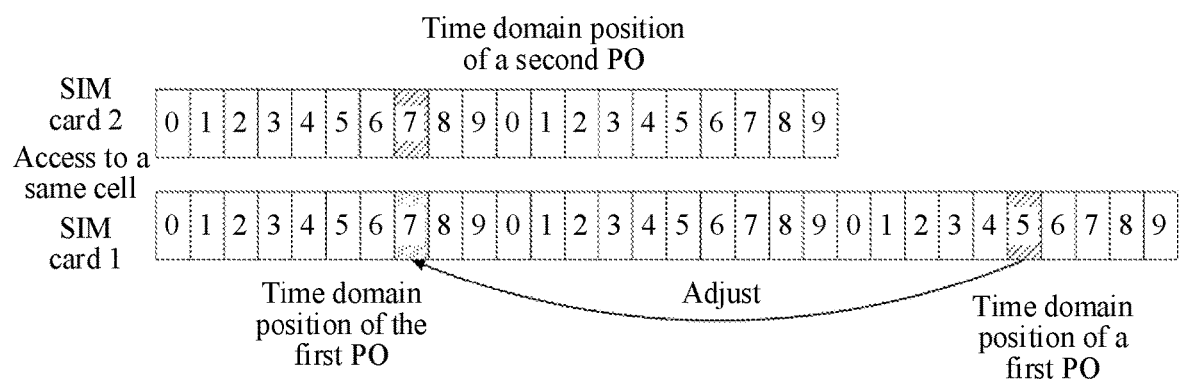
FIG. 4 is a schematic diagram of PO position adjustment according to an embodiment of this application.

As shown in FIG. 4, the first SIM card and the second SIM card access to a same cell (access to same cell), a first PO position corresponding to the first SIM card is a subframe whose index is 7 in a first PF, and a second PO position corresponding to the second SIM card is a subframe whose index is 5 in a third PF. It can be learned that the first PO position corresponding to the first SIM card and the second PO position corresponding to the second SIM card do not overlap at all. For example, as shown in FIG. 4, the first PO position corresponding to the first SIM card may be adjusted to the subframe 7 in the first PF, so that the first PO position corresponding to the first SIM card completely overlaps with the second PO position corresponding to the second SIM card. Therefore, the terminal device monitors, in the subframe whose index is 7 in the first PF, paging messages of the first SIM card and the second SIM card at the same time, and the battery power is saved.

It should be noted that the foregoing example 1 and example 2 are merely examples for description, and are not intended to limit this application. For example, in addition to the scenarios shown in the foregoing example 1 and example 2, the solution provided in this embodiment of this application may be further applied to another scenario in which the PO position needs to be adjusted.

Figure 5:
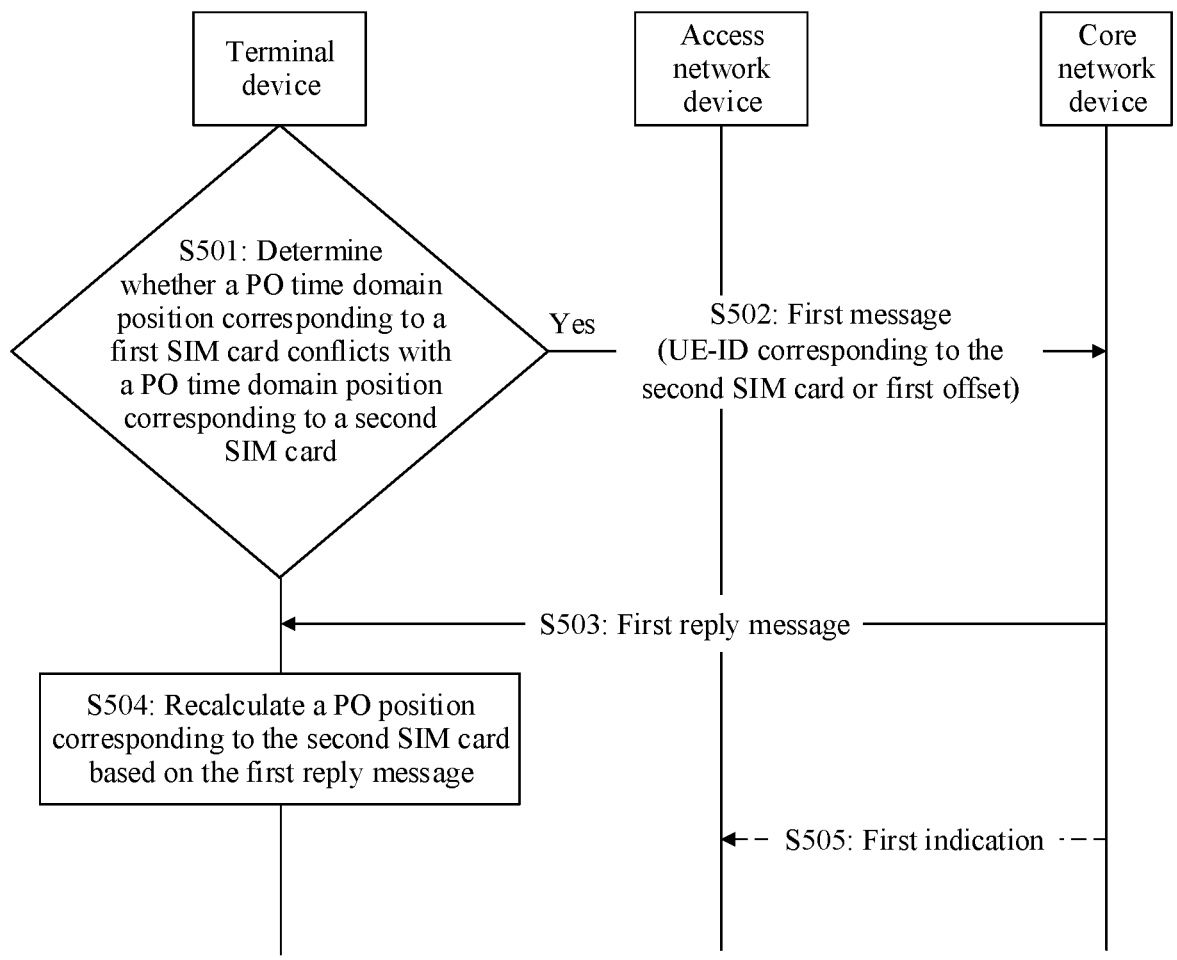
FIG. 5 is a flowchart of a communication method according to an embodiment of this application.

As shown in FIG. 5, an embodiment of this application further provides a procedure of a communication method. In this procedure, a terminal device is configured to use a first SIM card and a second SIM card. According to the procedure shown in FIG. 5, the identifier of the terminal device in the scenarios described in the foregoing example 1 and example 2 may be adjusted. The procedure may include the following steps:

S501: The terminal device determines whether a PO time domain position corresponding to the first SIM card conflicts with a PO time domain position corresponding to the second SIM card. If a conflict exists, S502 is performed. Otherwise, the procedure ends.

In this embodiment of this application, the terminal device may obtain an initial UE-ID corresponding to the first SIM card and an initial UE-ID corresponding to the second SIM card. The initial UE-ID may also be referred to as an unadjusted UE-ID. The PO time domain position corresponding to the first SIM card is determined based on the initial UE-ID corresponding to the first SIM card, and the PO time domain position corresponding to the second SIM card is determined based on the initial UE-ID corresponding to the second SIM card. In the scenario in the example 1, the PO time domain position corresponding to the first SIM card conflicts with the PO time domain position corresponding to the second SIM card. It may mean that the PO time domain position corresponding to the first SIM card completely overlaps or partially overlaps with the PO time domain position corresponding to the second SIM card. In the scenario in the example 2, the PO time domain position corresponding to the first SIM card conflicts with the PO time domain position corresponding to the second SIM card. It may mean that the PO time domain position corresponding to the first SIM card and the PO time domain position corresponding to the second SIM card partially overlap or do not overlap at all.

S502: The terminal device sends a first message to a core network device, where the first message includes a first offset, or the first message includes an update UE-ID corresponding to the second SIM card. The first offset may be an offset between the initial UE-ID corresponding to the second SIM card and the update UE-ID corresponding to the second SIM card. For example, the core network device may be an access and mobility management function (access and mobility management function, AMF) entity.

It should be noted that, in this embodiment of this application, an access network device corresponding to the first SIM card and an access network device corresponding to the second SIM card may be the same or different, and a core network device corresponding to the first SIM card and a core network device corresponding to the second SIM card may be the same or different. In the foregoing S502, the terminal device may send the first message to the core network device corresponding to the first SIM card. Correspondingly, in the following S503, the core network device corresponding to the first SIM card sends a first reply message to the terminal device. Alternatively, in the foregoing S502, the terminal device may send the first message to the core network device corresponding to the second SIM card. Correspondingly, in the following S503, the core network device corresponding to the first SIM card sends a first reply message to the terminal device. The core network device corresponding to the first SIM card and the core network device corresponding to the second SIM card may be a same network device, or may be different network devices. This is not limited.

S503: The core network device sends the first reply message to the terminal device, where the first reply message may be used to indicate the core network device to approve/accept an application using the first offset of the terminal device or the update UE-ID corresponding to the second SIM card, that is, the core network device approves the application of the terminal device. Alternatively, the core network device may not approve the application of the terminal device, and reallocate an identifier to the second SIM card. The reallocated identifier may be referred to as a recommendation UE-ID corresponding to the second SIM card, and the recommendation UE-ID corresponding to the second SIM card may be carried in the first reply message.

For example, in this embodiment of this application, the first message may be a registration message of the second SIM card, and the first reply message may be a registration response message of the second SIM card. Alternatively, the first message may be a tracking area update (tracking area update, TAU) message, and the first reply message may be a TAU response message, and the like.

S504: The terminal device recalculates a PO position corresponding to the second SIM card based on the first reply message.

In this embodiment of this application, if the first reply message is used to indicate the core network device to accept the application of the terminal device, the terminal device may recalculate the PO position corresponding to the second SIM card based on the first offset or the update UE-ID corresponding to the second SIM card that is carried in the first message. If the first reply message carries the recommendation UE-ID corresponding to the second SIM card, the terminal device recalculates the PO position corresponding to the second SIM card based on the recommendation UE-ID corresponding to the second SIM card that is carried in the first reply message.

The PO position corresponding to the second SIM card that is obtained after recalculation does not conflict with the PO position corresponding to the first SIM card. That is, in the scenario in the example 1, the PO position corresponding to the first SIM card and the PO position corresponding to the second SIM card that is obtained after recalculation do not overlap at all. In the scenario in the example 2, the PO position corresponding to the first SIM card completely overlaps with the PO position corresponding to the second SIM card that is obtained after recalculation.

In this embodiment of this application, for a process in which the terminal device recalculates the PO position corresponding to the second SIM card based on the update UE-ID corresponding to the second SIM card or the recommendation UE-ID corresponding to the second SIM card, refer to the following descriptions in a formula 1.1 and a formula 1.2. The process in which the terminal device recalculates the PO position corresponding to the second SIM card based on the first offset may be as follows:

In a first case, the terminal device may determine the update UE-ID corresponding to the second SIM card based on the first offset and the initial UE-ID corresponding to the second SIM card, and the terminal device may recalculate the PO position corresponding to the second SIM card based on the update UE-ID corresponding to the second SIM card.

For example, the terminal device may recalculate the PO position corresponding to the second SIM card based on the following formula 1.1 and formula 1.2. For example, a parameter "UE-ID" in the following formula 1.1 and formula 1.2 is in a form of "the first offset+the initial UE-ID corresponding to the second SIM card", or may be in a form of "the update UE-ID corresponding to the second SIM card".

In a second case, the terminal device may preliminarily calculate a PO position of the second SIM card by using the initial UE-ID of the second SIM card. Then, the PO position of the second SIM card that is obtained through preliminary calculation is adjusted by using the first offset, to obtain the final PO position of the second SIM card.

For example, the terminal device may preliminarily calculate the PO position corresponding to the second SIM card based on the following formula 1.1 and formula 1.2. For example, the initial UE-ID corresponding to the second SIM card is used for the parameter "UE-ID" in the following formula 1.1 and formula 1.2.

In a third case, the terminal device may recalculate the PO position corresponding to the second SIM card by using both the initial UE-ID corresponding to the second SIM card and the first offset.

For example, the terminal device may adjust, by using the first offset, another parameter except the UE-ID in the following formula 1.1 and formula 1.2, to obtain the PO position corresponding to the second SIM card. For example, the initial UE-ID corresponding to the second SIM card is used for the parameter "UE-ID" in the following formula 1.1 and formula 1.2, and a value of the first offset may be used to adjust another parameter except the "UE-ID" in the following formula 1.1 and formula 1.2. For example, the another parameter may be a PF_offset or an SFN.

Optionally, in the procedure shown in FIG. 5, the method may further include S505: The core network device sends a first indication to the access network device, where the first indication includes the first offset, the update UE-ID corresponding to the second SIM card, the recommendation UE-ID corresponding to the second SIM card, and the like.

For example, in this embodiment of this application, paging to the terminal device may be classified into two types: paging initiated by the core network device to the terminal device, for example, paging to the terminal device in an idle (idle) state; and paging initiated by the access network device to the terminal device, for example, paging to the terminal device in an inactive (inactive) state. In this embodiment of this application, for paging corresponding to the second SIM card, if the paging is initiated by the core network device, a paging message includes the update UE-ID corresponding to the second SIM card or the recommendation UE-ID corresponding to the second SIM card. If the paging is initiated by the access network device, the paging message also needs to include the update UE-ID corresponding to the second SIM card or the recommendation UE-ID corresponding to the second SIM card. Therefore, in this embodiment of this application, in the step S505, the core network device needs to notify the access network device of the first offset, the update UE-ID corresponding to the second SIM card, or the recommendation UE-ID corresponding to the second SIM card. In addition, when the access network device initiates paging to the terminal device, the access network device needs to notify another access network device in a specific area of the first offset, the update UE-ID corresponding to the second SIM card, or the recommendation UE-ID corresponding to the second SIM card.

It can be learned from the foregoing descriptions that, in this embodiment of this application, the PO position corresponding to the second SIM card may be flexibly adjusted by adjusting the UE-ID corresponding to the second SIM card, to avoid a conflict between the PO position corresponding to the first SIM card and the PO position corresponding to the second SIM card, and avoid missing monitoring a paging message corresponding to a specific SIM card.

For example, in this embodiment of this application, a process in which the terminal device calculates a PO position based on the UE-ID corresponding to the first SIM card or the UE-ID corresponding to the second SIM card may include:

1. Calculate a paging frame PF corresponding to the PO position according to the following formula 1.1:

$$(SFN+PF\_offset) \bmod T = (T \operatorname{div} N)*(UE\_ID \bmod N) \quad \text{Formula 1.1}$$

SFN represents a frame number of the paging frame PF, PF_offset represents an offset of the paging frame PF, T represents a paging cycle of the terminal device, a unit of T may be a frame, N represents a quantity of PFs in one paging cycle, the UE-ID is a value of an S-TMSI or an IMSI of the terminal device mod 1024, and both a value of PF_offset and a value of N are broadcast by a current cell. It may be understood that, when the foregoing formula 1.1 is used to calculate the PO position corresponding to the first SIM card, the UE-ID in the foregoing formula 1.1 is specifically a value of an S-TMSI or an IMSI corresponding to the first SIM card mod 1024. When the foregoing formula 1.1 is used to calculate the PO position corresponding to the second SIM card, the UE-ID in the foregoing formula 1.1 is specifically a value of an S-TMSI or an IMSI corresponding to the second SIM card mod 1024, and the like.

2. After determining the paging frame PF, determine the PO position.

A PO number is calculated according to the following formula 1.2, and the PO position is found based on the PO number. After the PO position is obtained, a PO configuration of the UE may be found based on a configuration of a paging search space of the current cell.

$$i\_s = \operatorname{floor}(UE\_ID/N) \bmod Ns \quad \text{Formula 1.2}$$

i_s represents the PO number, Ns represents a quantity of POs in one paging frame PF, and a value of Ns may be broadcast by the current cell.

It can be learned from the foregoing descriptions that, in the parameters for determining the PO position of the UE, another parameter rather than the UE-ID comes from the current cell, that is, the another parameter is a parameter shared by all UEs in the current cell. Different UE-IDs may correspond to different PO positions of different UEs.

Figure 6:
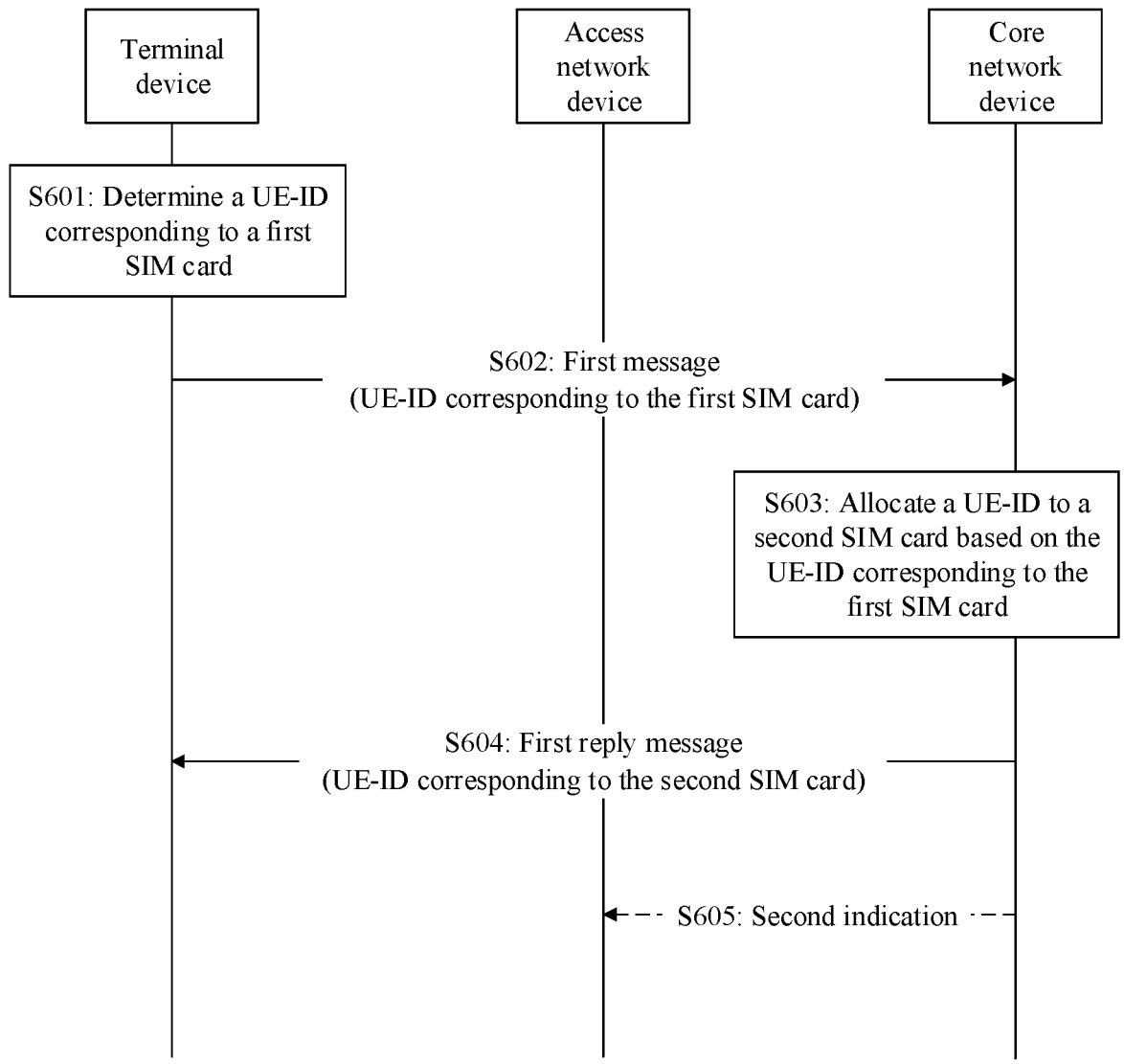
FIG. 6 is a flowchart of a communication method according to an embodiment of this application.

As shown in FIG. 6, this embodiment of this application further provides a procedure of a communication method. In this procedure, a terminal device is configured to use a first SIM card and a second SIM card. According to the procedure shown in FIG. 6, the initial identifier of the terminal device in the scenario described in the example 2 may be adjusted. The procedure may include the following steps:

S601: The terminal device determines a UE-ID corresponding to the first SIM card.

S602: The terminal device sends a first message to a core network device, where the first message carries the UE-ID corresponding to the first SIM card.

It should be noted that, in this embodiment of this application, an access network device of the first SIM card and an access network device of the second SIM card may be the same or different, and a core network device of the first SIM card and a core network device of the second SIM card may be the same or different. For example, in S602, the terminal device may specifically send the first message to the core network device of the second SIM card, where the first message carries the UE-ID corresponding to the first SIM card, and the first message may implicitly indicate an association relationship between the first SIM card and the second SIM card. Alternatively, optionally, the first message in S602 may further include first indication information, and the first indication information may indicate the association relationship between the first SIM card and the second SIM card.

S603: The core network device allocates a UE-ID to the second SIM card based on the UE-ID corresponding to the first SIM card.

For example, when the core network device allocates the UE-ID to the second SIM card, the following principle needs to be met: A value of the UE-ID corresponding to the first SIM card mod 1024 is the same as a value of the UE-ID corresponding to the second SIM card mod 1024.

S604: The core network device sends a first reply message to the terminal device, where the first reply message includes the UE-ID corresponding to the second SIM card.

For example, in this embodiment of this application, the first message in S602 may be a registration message of the second SIM card, and the first reply message in S604 may be a registration response message of the second SIM card. Alternatively, the first message in S602 may be a TAU message, and the first reply message in S604 may be a TAU response message.

Optionally, in the procedure shown in FIG. 6, the method may further include S605: The core network device sends a second indication to the access network device, where the second indication includes the UE-ID corresponding to the second SIM card, so that the access network device initiates paging to the second SIM card.

Figure 7:
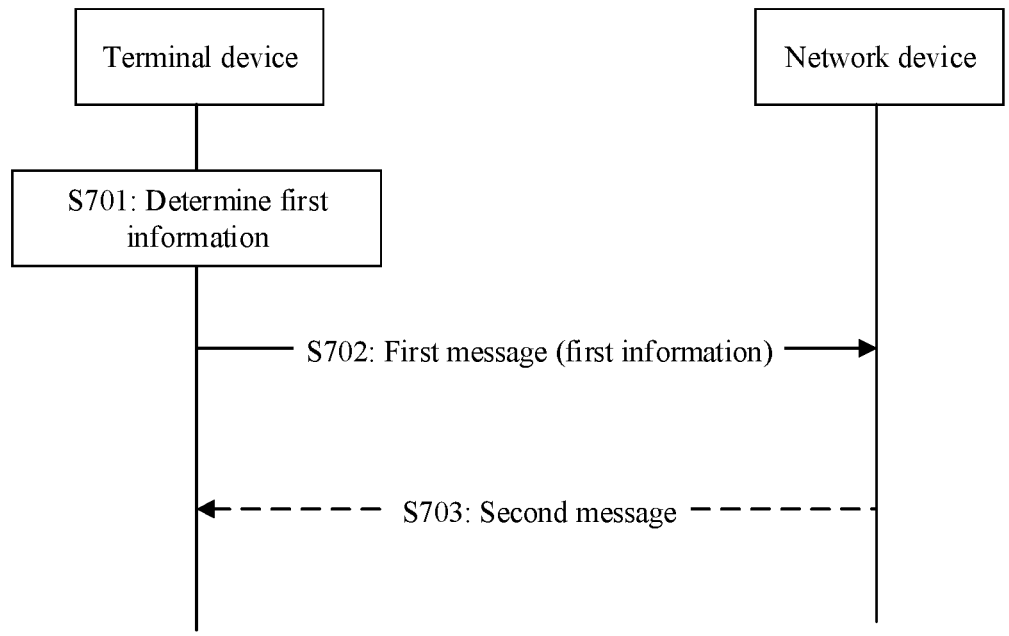
FIG. 7 is a flowchart of a communication method according to an embodiment of this application.

As shown in FIG. 7, a procedure of a communication method is provided. In the procedure, a terminal device may be the terminal device 100 in FIG. 1, and a network device may be the access network device 110 or the core network device 120 in FIG. 1. The procedure may include the following steps:

S701: The terminal device determines first information, where the first information is used to request to associate a first identifier and a second identifier of the terminal device.

For example, in this embodiment of this application, an association relationship between the first identifier and the second identifier may mean that the first identifier is a primary identifier, and the second identifier is a secondary identifier. A paging message corresponding to the second identifier is transferred to paging corresponding to the first identifier. Alternatively, the second identifier is the primary identifier, and the first identifier is the secondary identifier, and a paging message corresponding to the first identifier is transferred to paging corresponding to the second identifier. In this embodiment of this application, the terminal device may indicate the association relationship between the first identifier and the second identifier by using the first information. Alternatively, the network device may indicate the association relationship between the first identifier and the second identifier by using a sent second message.

For example, the terminal device may implicitly indicate the association relationship between the first identifier and the second identifier by using the first information. For example, the first information includes the first identifier and the second identifier. If the first identifier is placed before the second identifier, it indicates that the first identifier is the primary identifier, and the second identifier is the secondary identifier. Alternatively, if the second identifier is placed before the first identifier, it indicates that the second identifier is the primary identifier, and the first identifier is the secondary identifier. Alternatively, the terminal device may explicitly indicate the association relationship between the first identifier and the second identifier by using the first information. For example, the first information may include a first indication, and the first indication is used to indicate the association relationship between the first identifier and the second identifier. For example, if the first indication is 1, it indicates that the first identifier is the primary identifier, and the second identifier is the secondary identifier. If the first indication is 0, it indicates that the second identifier is the primary identifier, and the first identifier is the secondary identifier.

S702: The terminal device sends a first message carrying the first information to the network device.

For example, in the foregoing S702, the terminal device may send the first message to a network device corresponding to the first identifier. Correspondingly, in the following S703, the network device corresponding to the first identifier may send a second message to the terminal device. Alternatively, in the foregoing S702, the terminal device may send the first message to a network device corresponding to the second identifier. Correspondingly, in the following S703, the network device corresponding to the second identifier sends a second message to the terminal device. The network device corresponding to the first identifier and the network device corresponding to the second identifier may be a same network device, or may be different network devices. This is not limited.

It should be noted that the method in the procedure shown in FIG. 7 may be applied to a dual SIM dual standby terminal device, or may be applied to a single SIM single standby terminal device. The dual SIM dual standby terminal device may be configured to use a first SIM card and a second SIM card. The single SIM single standby terminal device may be configured to use a first SIM card. The SIM card in this embodiment of this application may be a physical SIM card, or may be a virtual SIM card. For example, when the procedure shown in FIG. 7 is applied to a dual SIM dual standby scenario, the first identifier in S701 may correspond to a UE-ID of the first SIM card, and the second identifier may correspond to a UE-ID of the second SIM card.

Optionally, in the procedure shown in FIG. 7, the method further includes S703: The network device sends the second message to the terminal device, where the second message carries second indication information, and the second indication information is used to indicate whether the network device approves/accepts a request of the terminal device for establishing the association relationship between the first identifier and the second identifier. For example, when the second indication information is 1, it indicates that the network device approves/accepts the request of the terminal device for requesting to establish the association relationship between the first identifier and the second identifier of the terminal device. When the second indication information is 0, it indicates that the network device rejects/does not accept the request of the terminal device for requesting to establish the association relationship between the first identifier and the second identifier of the terminal device.

For example, when the network device indicates the relationship between the first identifier and the second identifier by using the second message, the second message may include third indication information, and the third indication information is used to indicate the relationship between the first identifier and the second identifier. For example, if the third indication information is 1, it indicates that the first identifier is the primary identifier, and the second identifier is the secondary identifier. If the third indication information is 0, it indicates that the first identifier is the secondary identifier, and the second identifier is the primary identifier.

For example, it can be learned from the foregoing descriptions that, in the dual SIM dual standby scenario, the first identifier of the terminal device corresponds to the UE-ID of the first SIM card, and the second identifier of the terminal device corresponds to the UE-ID of the second SIM card. The foregoing process of associating the first identifier and the second identifier of the terminal device may be: The first SIM card is used as a primary card, the second SIM card is used as a secondary card, and paging to the second SIM card is transferred to the first SIM card. Alternatively, it may be described as: The network device may send the paging message corresponding to the first SIM card and/or the paging message corresponding to the second SIM card at a PO position corresponding to the first SIM card. The paging message corresponding to the first SIM card carries the UE-ID corresponding to the first SIM card, and the paging message corresponding to the second SIM card carries the UE-ID corresponding to the second SIM card.

In this embodiment of this application, when the first identifier is the primary identifier, the terminal device determines a first PO based on the first identifier, and receives a paging message on the first PO, where the paging message includes the first identifier and/or the second identifier. When the second identifier is the primary identifier, the terminal device determines a second PO based on the second identifier, and receives a paging message on the second PO, where the paging message includes the first identifier and/or the second identifier. It should be noted that when the terminal device receives the paging message on the first PO, the terminal device receives the paging message only on the first PO, and does not receive the paging message on the second PO. When the terminal device receives the paging message on the second PO, the terminal device receives the paging message only on the second PO, and does not receive the paging message on the first PO.

It should be noted that, in the dual SIM dual standby scenario, the procedure shown in FIG. 7 may be specifically applied to a registration scenario of the second SIM card. The first message and the second message in the procedure shown in FIG. 7 may respectively correspond to a registration message of the second SIM card and a registration response message of the second SIM card. Alternatively, because the UE-ID of the second SIM card corresponds to the second identifier of the terminal device in the procedure shown in FIG. 7, the first message may also be referred to as a registration message corresponding to the second identifier, and the second message may also be referred to as a registration response message corresponding to the second identifier. Alternatively, the procedure shown in FIG. 7 may be specifically applied to a TAU scenario, and the first message and the second message in the procedure shown in FIG. 7 may respectively correspond to a TAU message and a TAU response message.

Further, it should be noted that, in the procedure shown in FIG. 7, the first identifier may correspond to a first S-TMSI, and the second identifier may correspond to a second S-TMSI. In the dual SIM dual standby scenario, the first identifier may correspond to an S-TMSI of the first SIM card, that is, the UE-ID corresponding to the first SIM card is the S-TMSI of the first SIM card; and the second identifier may correspond to an S-TMSI of the second SIM card, that is, the UE-ID corresponding to the second SIM card is the S-TMSI of the second SIM card. Alternatively, the first identifier in the procedure shown in FIG. 7 may correspond to a first I-RNTI, and the second identifier may correspond to a second I-RNTI. In the dual SIM dual standby scenario, the first identifier may correspond to an I-RNTI of the first SIM card, that is, the UE-ID corresponding to the first SIM card is the I-RNTI of the first SIM card. The second identifier may correspond to an I-RNTI of the second SIM card, that is, the UE-ID corresponding to the second SIM card is the I-RNTI of the second SIM card.

For example, the network device in the procedure shown in FIG. 7 may be a core network device, such as an AMF. The procedure in FIG. 7 may further include: The core network device sends indication information to an access network device, where the indication information is used to indicate that the first identifier and the second identifier of the terminal device are associated. It can be learned from the foregoing descriptions in FIG. 2 that paging to the terminal device may be initiated by the core network device, or may be initiated by the access network device. The core network device notifies the access network device of the association relationship between the first identifier and the second identifier of the terminal device, so that the access network device transfers paging corresponding to the second identifier to the first identifier, that is, a paging message corresponding to the first identifier and/or a paging message corresponding to the second identifier may be initiated at the first PO position corresponding to the first identifier.

For example, the network device in the procedure shown in FIG. 7 may be a core network device, such as an AMF, and the procedure in FIG. 7 may further include: The core network device sends a paging message to the access network device, where the paging message includes the first identifier of the terminal device and the second identifier of the terminal device.

It should be noted that for paging initiated by the core network device, essentially, the core network device first sends the paging message to the access network device, and then the access network device initiates specific paging. For paging corresponding to the second identifier of the terminal device, in this embodiment of this application, the paging message sent by the core network device to the access network device further includes the first identifier of the terminal device in addition to the second identifier of the terminal device. After receiving the paging message, the access network device may calculate a paging occasion based on the first identifier of the terminal device. The access network device sends the paging message on the corresponding paging occasion, where the paging message includes the first identifier and/or the second identifier of the terminal device. The foregoing process of sending the paging message including the second identifier of the terminal device on the paging occasion corresponding to the first identifier may also be referred to as transferring paging corresponding to the second identifier of the terminal device to the first identifier of the terminal device.

It can be learned from the foregoing descriptions that, in this embodiment of this application, at the first PO position corresponding to the first identifier, the terminal device may receive the paging message corresponding to the first identifier and/or the paging message corresponding to the second identifier. Corresponding to the fact that the terminal device may receive only the paging message corresponding to the first identifier at the first PO position corresponding to the first identifier, the terminal device may receive only the paging message corresponding to the second identifier at the second PO position corresponding to the second identifier. This can reduce monitoring energy consumption of the terminal device.

Figure 8:
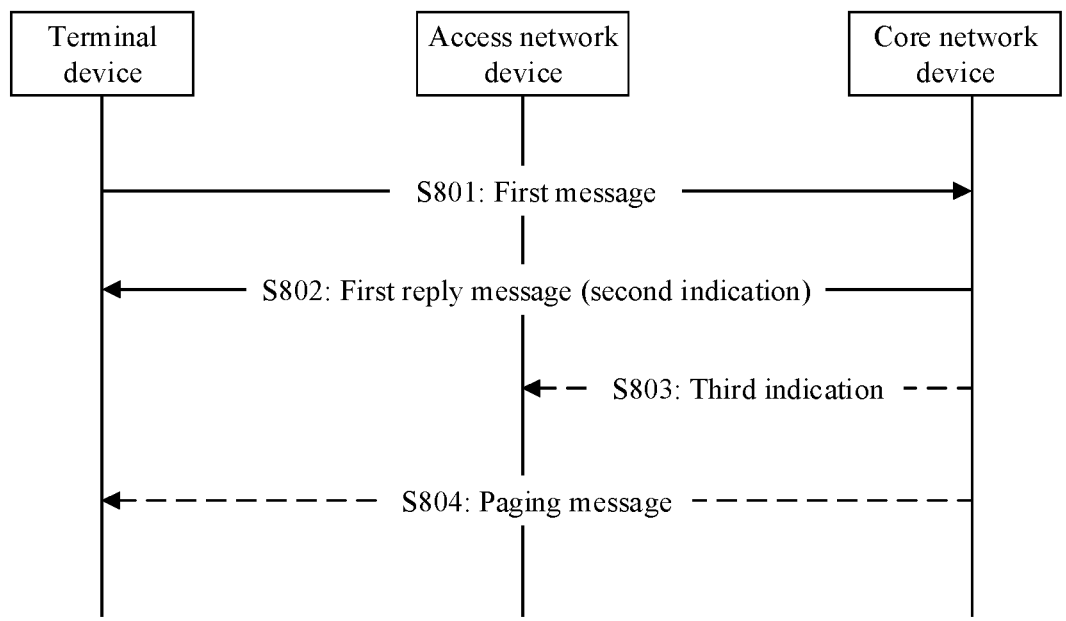
FIG. 8 is a flowchart of a communication method according to an embodiment of this application.

For the method provided in FIG. 7, as shown in FIG. 8, a procedure of a communication method is provided. In the procedure, a terminal device is configured to use a first SIM card and a second SIM card, and in the procedure shown in FIG. 7, a first identifier of the terminal device may correspond to a UE-ID of the first SIM card, and a second identifier of the terminal device may correspond to a UE-ID of the second SIM card. The procedure includes the following steps:

S801: The terminal device sends a first message to a core network device, where the first message is used to request to establish an association relationship between the first SIM card and the second SIM card. The association relationship between the first SIM card and the second SIM card may mean that the first SIM card is used as a primary card, the second SIM card is used as a secondary card, and paging to the second SIM card is transferred to the first SIM card. Alternatively, the association relationship between the first SIM card and the second SIM card may mean that the second SIM card is used as a primary card, the first SIM card is used as a secondary card, and a paging message of the first SIM card is transferred to the second SIM card. In this embodiment of this application, the association relationship between the first SIM card and the second SIM card, that is, a relationship between the primary and secondary cards in the first SIM card and the second SIM card, may be indicated in the first message sent by the terminal device, or may be indicated in a first reply message sent by the core network device.

For example, in this embodiment of this application, the first message may implicitly indicate the association relationship between the first SIM card and the second SIM card. The first message may include the UE-ID corresponding to the first SIM card and the UE-ID corresponding to the second SIM card. If the UE-ID corresponding to the first SIM card is placed before the UE-ID corresponding to the second SIM card, it indicates that the first SIM card is used as the primary card, and the second SIM card is used as the secondary card. If the UE-ID corresponding to the second SIM card is placed before the UE-ID corresponding to the first SIM card, it indicates that the second SIM card is used as the primary card, and the first SIM card is used as the secondary card.

For example, in this embodiment of this application, the first message may explicitly indicate the association relationship between the first SIM card and the second SIM card. For example, the first message may include a first indication, and the first indication may indicate the association relationship between the first SIM card and the second SIM card. For example, if the first indication is 1, it indicates that the first SIM card is used as the primary card, and the second SIM card is used as the secondary card. If the first indication is 0, it indicates that the second SIM card is the primary card, and the first SIM card is the secondary card.

S802: The core network device sends the first reply message to the terminal device, where the first reply message includes a second indication, and the second indication may indicate whether the core network device accepts a request of the terminal device. For example, if the second indication is 1, it indicates that the core network device approves/accepts the request of the terminal device for establishing the association relationship between the first SIM card and the second SIM card. If the second indication is 0, it indicates that the core network device rejects/does not accept the request of the terminal device for establishing the association relationship between the first SIM card and the second SIM card.

Optionally, when the core network device is used to indicate the association relationship between the first SIM card and the second SIM card, the first reply message may further include a third indication. For example, if the third indication is 1, it indicates that the first SIM card is the primary card, and the second SIM card is the secondary card. If the third indication is 0, it indicates that the second SIM card is the primary card, and the first SIM card is the secondary card.

For example, in this embodiment of this application, after receiving the first reply message sent by the core network device, the terminal device may determine a paging occasion of the first SIM card and a paging occasion of the second SIM card based on the first indication in the first reply message.

For example, if the first indication is used to indicate that the core network device to reject/not accept the request of the terminal device for establishing the association relationship between the first SIM card and the second SIM card, the terminal device may calculate a PO position corresponding to the first SIM card based on the UE-ID corresponding to the first SIM card. In addition, the terminal device monitors a paging message at the PO position corresponding to the first SIM card based on the UE-ID corresponding to the first SIM card. A PO position corresponding to the second SIM card is calculated based on the UE-ID corresponding to the second SIM card. In addition, the terminal device monitors paging at the PO position corresponding to the second SIM card based on the UE-ID corresponding to the second SIM card. For example, the first indication is used to indicate that the core network device to approve/accept the request of the terminal device for establishing the association relationship between the first SIM card and the second SIM card. If the first SIM card is the primary card, and the second SIM card is the secondary card, the terminal device calculates the PO position corresponding to the first SIM card based on the UE-ID corresponding to the first SIM card. The terminal device monitors the paging message at the PO position corresponding to the first SIM card based on the UE-ID corresponding to the first SIM card and the UE-ID corresponding to the second SIM card, and the terminal device no longer monitors the paging message at the PO position corresponding to the second SIM card. The foregoing process is a process in which a paging message of the second SIM card is transferred to the first SIM card. If the second SIM card is the primary card, and the first SIM card is the secondary card, the terminal device calculates the PO position corresponding to the second SIM card based on the UE-ID corresponding to the second SIM card. The terminal device monitors the paging message at the PO position corresponding to the second SIM card based on the UE-ID corresponding to the first SIM card and the UE-ID corresponding to the second SIM card, and the terminal device no longer monitors paging at the PO position corresponding to the first SIM card. The foregoing process is a process in which the paging message of the first SIM card is transferred to the second SIM card.

It can be learned from the foregoing descriptions that, in this embodiment of this application, if the core network device approves the request for establishing the association relationship between the first SIM card and the second SIM card, the terminal device may monitor paging messages of two SIM cards at one PO position, and energy consumption is reduced.

Optionally, in the procedure shown in FIG. 8, when the core network device approves/accepts the request of the terminal device for establishing the association relationship between the first SIM card and the second SIM card, the method may further include S803: The core network device sends the third indication to an access network device. The third indication is used to notify the core network device of the association relationship between the first SIM card and the second SIM card, so that the access network device transfers the paging message of the second SIM card to the first SIM card, or the access network device transfers the paging message of the first SIM card to the second SIM card.

Optionally, in the procedure shown in FIG. 8, if the core network device approves/accepts the request of the terminal device for establishing the association relationship between the first SIM card and the second SIM card, the method may further include the following step:

S804: The core network device sends a paging message to the terminal device.

For example, if the first SIM card is the primary card, and the second SIM card is the secondary card, when the paging message is used to page the first SIM card, the paging message may include the UE-ID corresponding to the first SIM card; when the paging message is used to page the second SIM card, the paging message may include the UE-ID corresponding to the second SIM card and the UE-ID corresponding to the first SIM card.

For example, if the second SIM card is the primary card, and the first SIM card is the secondary card, when the paging message is used to page the second SIM card, the paging message includes the UE-ID corresponding to the second SIM card; when the paging message is used to page the first SIM card, the paging message includes the UE-ID corresponding to the first SIM card and the UE-ID corresponding to the second SIM card.

For example, in this embodiment of this application, the core network device may first send the paging message to the access network device, and then the access network device forwards the paging message to the terminal device.

For a case in which the first SIM card is the primary card and the second SIM card is the secondary card, if the paging message is used to page the first SIM card, the paging message sent by the core network device includes the UE-ID corresponding to the first SIM card. If the paging message is used to page the second SIM card, the paging message sent by the core network device includes the UE-ID corresponding to the first SIM card and the UE-ID corresponding to the second SIM card. For example, after receiving the paging message sent by the core network device, the access network device may calculate a PO corresponding to the first SIM card based on the UE-ID corresponding to the first SIM card. Then, the paging message is sent to the terminal device on the PO corresponding to the first SIM card, where the paging message may be used to page the first SIM card, or the paging message may be used to page the second SIM card. Correspondingly, the terminal device monitors the paging message at the PO position corresponding to the first SIM card, and no longer monitors the paging message at the PO position corresponding to the second SIM card.

For a case in which the second SIM card is the primary card and the first SIM card is the secondary card. If the paging message is used to page the second SIM card, the paging message sent by the core network device includes the UE-ID corresponding to the second SIM card. If the paging message is used to page the first SIM card, the paging message sent by the core network device includes the UE-ID corresponding to the first SIM card and the UE-ID corresponding to the second SIM card. For example, after receiving the paging message sent by the core network device, the access network device may calculate a PO corresponding to the second SIM card based on the UE-ID corresponding to the second SIM card. Then, the paging is sent to the terminal device on the PO corresponding to the second SIM card, where the paging message may be used to page the first SIM card, or the paging message may be used to page the second SIM card. Correspondingly, the terminal device monitors the paging message at the PO position corresponding to the second SIM card, and no longer monitors the paging message at the PO position corresponding to the first SIM card.

It should be noted that the procedure shown in FIG. 8 may be applied to a scenario in which the terminal device is in a dual SIM dual standby mode and the first SIM card and the second SIM card of the terminal device are connected to a same cell or another scenario. The foregoing scenario is not construed as a limitation on this application.

In the embodiments provided in this application, the methods provided in the embodiments of this application are described from perspectives of the network device, the terminal, and interaction between the network device and the terminal. To implement functions in the foregoing methods provided in the embodiments of this application, the network device and the terminal may include a hardware structure and/or a software module, and implement the foregoing functions in a form of the hardware structure, the software module, or a combination of the hardware structure and the software module. Whether a function in the foregoing functions is performed by the hardware structure, the software module, or the combination of the hardware structure and the software module depends on particular applications and design constraints of the technical solutions.

Figure 9:
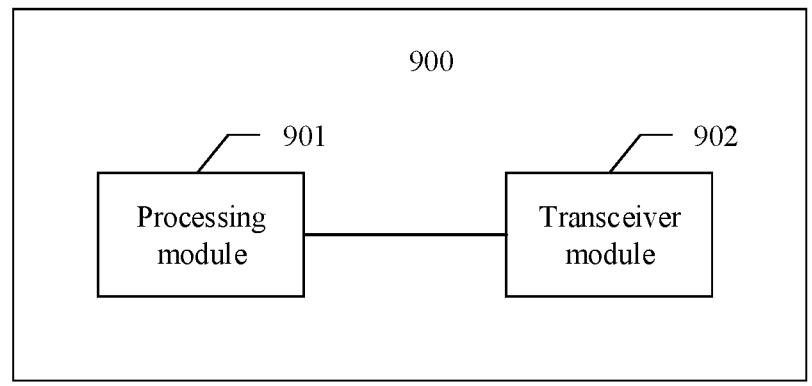
FIG. 9 is a schematic diagram of a structure of a communication apparatus according to an embodiment of this application.

Same as the foregoing concept, as shown in FIG. 9, an embodiment of this application further provides an apparatus 900. The apparatus 900 includes a processing module 901 and a transceiver module 902.

In an example, the apparatus 900 is configured to implement a function of the terminal device in the foregoing methods. The apparatus 900 may be a terminal device, or may be an apparatus in the terminal device.

For example, the processing module 901 is configured to determine first information, where the first information is used to request to adjust a first initial identifier of the terminal device. The transceiver module 902 is configured to send a first message carrying the first information to a network device.

For example, the processing module 901 is configured to determine first information, where the first information is used to request to associate a first identifier and a second identifier of the terminal device. The transceiver module 902 is configured to send a first message carrying the first information to a network device.

In an example, the apparatus 900 is configured to implement a function of the network device in the foregoing methods. The apparatus 900 may be a network device, or may be an apparatus in the network device.

For example, the transceiver module 902 is configured to receive a first message from a terminal device, where the first message carries first information, and the first information is used to request to adjust a first initial identifier of the terminal device. The processing module 901 is configured to process the first message.

For example, the transceiver module 902 is configured to receive a first message from a terminal device, where the first message carries first information, and the first information is used to request to associate a first identifier and a second identifier of the terminal device. The processing module 901 is configured to process the first message.

For specific processes of the processing module 901 and the transceiver module 902, refer to the descriptions in the foregoing method embodiments. Details are not described herein again.

For specific execution processes of the processing module 901 and the transceiver module 902, refer to the descriptions in the foregoing method embodiments. Division into the modules in this embodiment of this application is an example, is merely logical function division, and may be other division during actual implementation. In addition, function modules in the embodiments of this application may be integrated into one processor, or each of the modules may exist alone physically, or two or more modules may be integrated into one module. The integrated module may be implemented in a form of hardware, or may be implemented in a form of a software function module.

Figure 10:
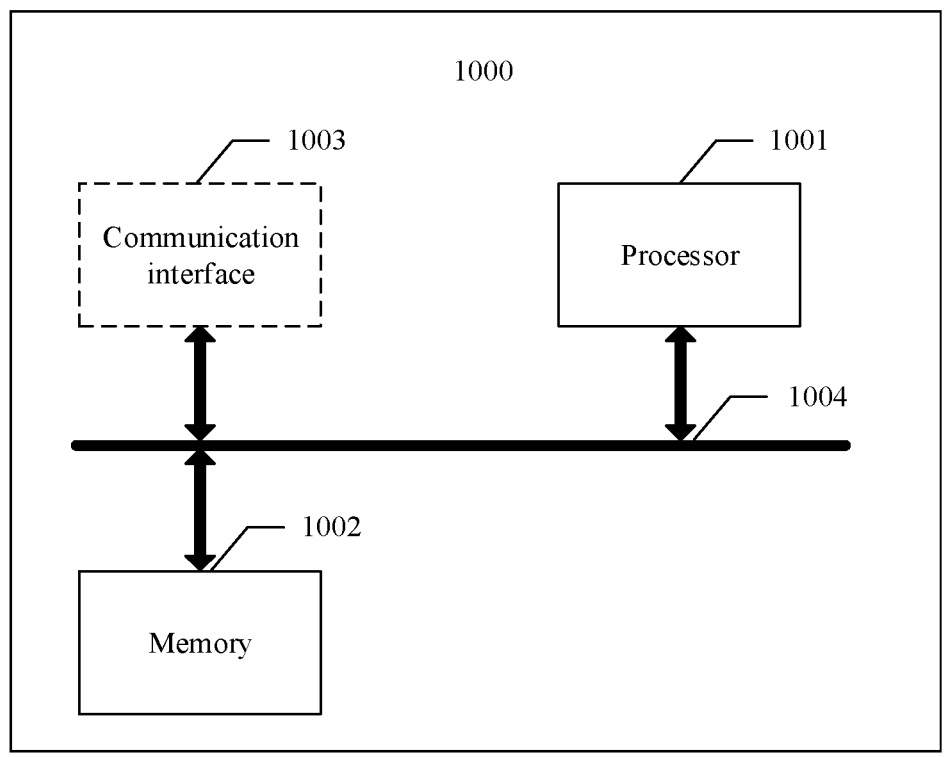
FIG. 10 is a schematic diagram of a structure of a communication apparatus according to an embodiment of this application.

Same as the foregoing concept, as shown in FIG. 10, this embodiment of this application provides an apparatus 1000.

In an example, the apparatus 1000 is configured to implement a function of the terminal device in the foregoing methods. The apparatus may be a terminal device, or may be an apparatus in the terminal device.

The apparatus 1000 includes at least one processor 1001, configured to implement the function of the terminal device in the foregoing methods. For example, the processor 1001 may determine first information, where the first information is used to request to adjust a first identifier of the terminal device, or the first information is used to request to associate a first identifier and a second identifier of the terminal device. For details, refer to the detailed descriptions in the methods. Details are not described herein again.

The apparatus 1000 may further include at least one memory 1002, configured to store program instructions and/or data. The memory 1002 is coupled to the processor 1001. Couplings in this embodiment of this application may be indirect couplings or communication connections between apparatuses, units, or modules, may be in an electrical form, a mechanical form, or another form, and are used for information exchange between the apparatuses, the units, or the modules. The processor 1001 may operate in collaboration with the memory 1002. The processor 1001 may execute the program instructions stored in the memory 1002. At least one of the at least one memory may be included in the processor.

The apparatus 1000 may further include a communication interface 1003, configured to communicate with another device through a transmission medium, so that an apparatus in the apparatus 1000 can communicate with the another device. For example, the communication interface 1003 may be a transceiver, a circuit, a bus, a module, or a communication interface of another type, and the another device may be a network device. The processor 1001 receives and sends data through the communication interface 1003, and is configured to implement the methods in the foregoing embodiments. For example, the processor 1001 may send, through the communication interface 1003, a first message carrying the first information.

In an example, the apparatus 1000 is configured to implement a function of the network device in the foregoing methods. The apparatus may be a network device, or may be an apparatus in the network device.

The apparatus 1000 includes at least one processor 1001, configured to implement the function of the network device in the foregoing methods. For example, the processor 1001 may process a first message, where the first message carries first information, and the first information is used to request to adjust a first initial identifier of the terminal device, or the first information is used to request to associate a first identifier and a second identifier of the terminal device. For details, refer to the detailed descriptions in the methods. Details are not described herein again.

The apparatus 1000 may further include at least one memory 1002, configured to store program instructions and/or data. The memory 1002 is coupled to the processor 1001. Couplings in this embodiment of this application may be indirect couplings or communication connections between apparatuses, units, or modules, may be in an electrical form, a mechanical form, or another form, and are used for information exchange between the apparatuses, the units, or the modules. The processor 1001 may operate in collaboration with the memory 1002. The processor 1001 may execute the program instructions stored in the memory 1002. At least one of the at least one memory may be included in the processor.

The apparatus 1000 may further include a communication interface 1003, configured to communicate with another device through a transmission medium, so that an apparatus in the apparatus 1000 can communicate with the another device. For example, the communication interface 1003 may be a transceiver, a circuit, a bus, a module, or a communication interface of another type, and the another device may be a terminal device. The processor 1001 receives and sends data through the communication interface 1003, and is configured to implement the methods in the foregoing embodiments. For example, the processor 1001 may receive the first message through the communication interface 1003, where the first message carries the first information, and the first information is used to request to adjust the first initial identifier of the terminal device, or the first information is used to request to associate the first identifier and the second identifier of the terminal device. For details, refer to the detailed descriptions in the methods. Details are not described herein again.

A specific connection medium between the communication interface 1003, the processor 1001, and the memory 1002 is not limited in this embodiment of this application. In this embodiment of this application, the memory 1002, the processor 1001, and the communication interface 1003 are connected through a bus 1004 in FIG. 10. The bus is represented by using a thick line in FIG. 10. A connection manner between other components is merely an example for description, and is not limited thereto. The bus may be classified into an address bus, a data bus, a control bus, and the like. For ease of representation, only one thick line is used to represent the bus in FIG. 10, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps in the methods disclosed with reference to the embodiments of this application may be directly performed by a hardware processor, or may be performed by using a combination of hardware in the processor and a software module.

In the embodiments of this application, the memory may be a non-volatile memory, such as a hard disk drive (hard disk drive, HDD) or a solid-state drive (solid-state drive, SSD), or may be a volatile memory (volatile memory), such as a random access memory (random access memory, RAM). The memory is any other medium that can be used to carry or store expected program code in a form of instructions or a data structure and that can be accessed by a computer. However, this is not limited thereto. The memory in the embodiments of this application may alternatively be a circuit or any other apparatus that can implement a storage function, and is configured to store program instructions and/or data.

All or some of the methods in the embodiments of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the processes or functions according to the embodiments of the present invention are completely or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (digital video disc, DVD for short)), a semiconductor medium (for example, an SSD), or the like.

Clearly, a person skilled in the art can make various modifications and variations to this application without departing from the scope of this application. This application is intended to cover the modifications and variations of this application provided that they fall within the scope of the claims of this application and their equivalent technologies.

In the embodiments of this application, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between the associated objects. The term "at least one of the following items (pieces)" or a similar expression thereof means any combination of these items, including a single item (piece) or any combination of a plurality of items (pieces). For example, at least one of a, b, and c may represent: a, b, c, a and b, a and c, b and c, or a, b, and c, where a, b, and c may be singular or plural.

What is claimed is:

1. A communication method, comprising:
    determining that a first paging occasion (PO) time domain position corresponding to a first subscriber identity module (SIM) card conflicts with a second PO time domain position corresponding to a second SIM card;
    sending a first message to a core network device, wherein the first message comprises a first offset, the first offset indicates an offset between an initial UE-ID corresponding to the second SIM card and an update UE-ID corresponding to the second SIM card;
    receiving a first reply message from the core network device; and
    recalculating a PO position corresponding to the second SIM card based on the first reply message.

2. The method according to claim 1, wherein the first reply message comprises information indicating that application of the first offset is accepted by the core network device; or
    the first reply message comprises a recommendation UE-ID corresponding to the second SIM card reallocated by the core network device.

3. The method according to claim 1, wherein the first message is a registration message of the second SIM card, or the first message is a tracking area update (TAU) message.

4. The method according to claim 1, wherein the determining that a first paging occasion (PO) time domain position corresponding to a first subscriber identity module (SIM) card conflicts with a second PO time domain position corresponding to a second SIM card comprises:
    determining that the first PO time domain position partially overlaps or completely overlaps with a second PO time domain position, and a mode of a terminal device is single reception single transmission; or
    determining that the first PO time domain position partially overlaps or does not overlap with a second PO time domain position, and a mode of the terminal device is dual reception dual transmission.

5. A communication method, comprising:
    receiving, a first message from a terminal device, wherein the first message comprises a first offset, the first offset indicates an offset between an initial UE-ID corresponding to a second SIM card of the terminal device and an update UE-ID corresponding to the second SIM card of the terminal device;
    sending a first reply message to a terminal device, wherein the first reply message comprises information indicating that application of the first offset from the terminal device is accepted; or
    the first reply message comprises a recommendation UE-ID corresponding to the second SIM card that is reallocated.

6. The method according to claim 5, wherein the first message is a registration message of the second SIM card, or the first message is a tracking area update (TAU) message.

7. The method according to claim 5, wherein the first reply message is for recalculating PO position corresponding to the second SIM card.

8. The method according to claim 5, wherein the receiving a first message from a terminal device comprises:
    receiving a first message from a terminal device when a first PO time domain position corresponding to first SIM card of the terminal device conflicts with a second PO time domain position corresponding to the second SIM card of the terminal device.

9. A communications apparatus, comprising:
    one or more processors, and
    a memory configure to store program instructions;
    wherein, when executed by the one or more processors, the instructions cause the communications apparatus to:
    determine that a first paging occasion (PO) time domain position corresponding to a first subscriber identity module (SIM) card conflicts with a second PO time domain position corresponding to a second SIM card;
    send a first message to a core network device, wherein the first message comprises a first offset, the first offset indicates an offset between an initial UE-ID corresponding to the second SIM card and an update UE-ID corresponding to the second SIM card;
    receive a first reply message from the core network device; and
    recalculate a PO position corresponding to the second SIM card based on the first reply message.

10. The communications apparatus according to claim 9, wherein the first reply message comprises information indicating that application of the first offset is accepted by the core network device; or the first reply message comprises a recommendation UE-ID corresponding to the second SIM card reallocated by the core network device.

11. The communications apparatus according to claim 9, wherein the first message is a registration message of the second SIM card, or the first message is a tracking area update (TAU) message.

12. The communications apparatus according to claim 9, wherein determine that a first paging occasion (PO) time domain position corresponding to a first subscriber identity module (SIM) card conflicts with a second PO time domain position corresponding to a second SIM card comprises:

determine that the first PO time domain position partially overlaps or completely overlaps with a second PO time domain position, and a mode of the communications apparatus is single reception single transmission; or determine that the first PO time domain position partially overlaps or does not overlap with a second PO time domain position, and a mode of the communications apparatus is dual reception dual transmission.

13. A communications apparatus, comprising:
one or more processors, and
a memory configure to store program instructions;
wherein, when executed by the one or more processors, the instructions cause the communications apparatus to:

receive a first message from a terminal device, wherein the first message comprises a first offset, the first offset indicates an offset between an initial UE-ID corresponding to a second SIM card of the terminal device and an update UE-ID corresponding to the second SIM card of the terminal device;

send a first reply message to a terminal device, wherein the first reply message comprises information indicating that application of the first offset from the terminal device is accepted; or the first reply message comprises a recommendation UE-ID corresponding to the second SIM card that is reallocated.

14. The communications apparatus according to claim 13, wherein the first message is a registration message of the second SIM card, or the first message is a tracking area update (TAU).

15. The communications apparatus according to claim 13, wherein the first reply message is for recalculating PO position corresponding to the second SIM card.

16. The communications apparatus according to claim 13, wherein the receive a first message from a terminal device comprises:

receive a first message from a terminal device when a first PO time domain position corresponding to first SIM card of the terminal device conflicts with a second PO time domain position corresponding to the second SIM card of the terminal device.

* * * * *